(12) United States Patent
Field et al.

(10) Patent No.: US 8,467,941 B2
(45) Date of Patent: *Jun. 18, 2013

(54) APPARATUS AND METHOD FOR CONTROL OF A VEHICLE

(75) Inventors: J. Douglas Field, Los Gatos, CA (US); Michael T. Gansler, Candia, NH (US); John D. Heinzmann, Manchester, NH (US); Jon M. Stevens, Manchester, NH (US)

(73) Assignee: Segway, Inc., Bedford, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/455,346

(22) Filed: Apr. 25, 2012

(65) Prior Publication Data

US 2012/0239284 A1    Sep. 20, 2012

Related U.S. Application Data

(63) Continuation of application No. 12/266,170, filed on Nov. 6, 2008, now Pat. No. 8,170,780.

(51) Int. Cl.
*G06F 17/00* (2006.01)

(52) U.S. Cl.
USPC ............. 701/49; 701/31.4; 701/33.8; 701/70; 701/72; 701/83; 701/493; 340/438; 340/439; 340/442; 340/445; 180/167; 180/197

(58) Field of Classification Search
USPC ............. 701/22, 30.5, 38, 41, 124; 180/6.62, 180/7.1, 89.13, 65.8; 340/442, 443; 700/37, 700/40; 382/124; 318/432
See application file for complete search history.

(56) References Cited

U.S. PATENT DOCUMENTS

| | | | |
|---|---|---|---|
| 584,127 A | 6/1897 | Draullette et al. | |
| 734,109 A | 7/1903 | Tolcher | |
| 849,270 A | 4/1907 | Schafer et al. | |
| 2,742,973 A | 4/1956 | Johannesen | 180/8 |
| 3,145,797 A | 8/1964 | Taylor | 180/21 |
| 3,260,324 A | 7/1966 | Suarez | 180/10 |
| 3,288,234 A | 11/1966 | Feliz | 180/6.5 |

(Continued)

FOREIGN PATENT DOCUMENTS

| | | |
|---|---|---|
| CN | 101269683 A | 9/2008 |
| CN | 101513911 A | 8/2009 |

(Continued)

OTHER PUBLICATIONS

Kawaji, S., Stabilization of Unicycle Using Spinning Motion, *Denki Gakkai Ronbush, D*, vol. 107, Issue 1, Japan 1987, pp. 21-28.

(Continued)

*Primary Examiner* — McDieunel Marc
(74) *Attorney, Agent, or Firm* — Pierce Atwood LLP

(57) ABSTRACT

An apparatus and method for transporting a payload over a surface is provided. A vehicle supports a payload with a support partially enclosed by an enclosure. Two laterally disposed ground-contacting elements are coupled to at least one of the enclosure or support. A motorized drive is coupled to the ground-contacting elements. A controller coupled to the drive governs the operation of the drive at least in response to the position of the center of gravity of the vehicle to dynamically control balancing of the vehicle.

20 Claims, 30 Drawing Sheets

U.S. PATENT DOCUMENTS

| | | | | |
|---|---|---|---|---|
| 3,348,518 A | 10/1967 | Forsyth et al. | | 115/1 |
| 3,374,845 A | 3/1968 | Selwyn | | 180/6.5 |
| 3,399,742 A | 9/1968 | Malick | | 180/21 |
| 3,446,304 A | 5/1969 | Alimanestiano | | 180/9.24 |
| 3,450,219 A | 6/1969 | Fleming | | 180/8 |
| 3,515,401 A | 6/1970 | Gross | | 280/5.26 |
| 3,580,344 A | 5/1971 | Floyd | | 180/8 A |
| 3,596,298 A | 8/1971 | Durst, Jr. | | 5/81 |
| 3,860,264 A | 1/1975 | Douglas et al. | | 280/266 |
| 3,872,945 A | 3/1975 | Hickman et al. | | 180/65 R |
| 3,952,822 A | 4/1976 | Udden et al. | | 180/21 |
| 4,018,440 A | 4/1977 | Deutsch | | 272/70.3 |
| 4,062,558 A | 12/1977 | Wasserman | | 280/205 |
| 4,076,270 A | 2/1978 | Winchell | | 280/220 |
| 4,088,199 A | 5/1978 | Trautwein | | 180/25 R |
| 4,094,372 A | 6/1978 | Notter | | 180/1 G |
| 4,109,741 A | 8/1978 | Gabriel | | 180/21 |
| 4,111,445 A | 9/1978 | Haibeck | | 280/79.3 |
| 4,151,892 A | 5/1979 | Francken | | 180/77 H |
| 4,222,449 A | 9/1980 | Feliz | | 180/8 A |
| 4,264,082 A | 4/1981 | Fouchey, Jr. | | 280/5.26 |
| 4,266,627 A | 5/1981 | Lauber | | 180/8 B |
| 4,293,052 A | 10/1981 | Daswick et al. | | 180/219 |
| 4,325,565 A | 4/1982 | Winchell | | 280/282 |
| 4,354,569 A | 10/1982 | Eichholz | | 180/211 |
| 4,363,493 A | 12/1982 | Veneklasen | | 280/11.2 |
| 4,373,600 A | 2/1983 | Buschbom et al. | | 180/212 |
| 4,375,840 A | 3/1983 | Campbell | | 180/6.5 |
| 4,510,956 A | 4/1985 | King | | 135/67 |
| 4,560,022 A | 12/1985 | Kassai | | 180/65.1 |
| 4,566,707 A | 1/1986 | Nitzberg | | 180/8.2 |
| 4,570,078 A | 2/1986 | Yashima et al. | | 307/10 R |
| 4,571,844 A | 2/1986 | Komasaku et al. | | 33/366 |
| 4,624,469 A | 11/1986 | Bourne, Jr. | | 280/112 A |
| 4,657,272 A | 4/1987 | Davenport | | 280/266 |
| 4,685,693 A | 8/1987 | Vadjunec | | 280/242 WC |
| 4,709,772 A | 12/1987 | Brunet | | 180/8.2 |
| 4,716,980 A | 1/1988 | Butler | | 180/19.2 |
| 4,740,001 A | 4/1988 | Torleumke | | 280/11.115 |
| 4,746,132 A | 5/1988 | Eagan | | 280/1.13 |
| 4,770,410 A | 9/1988 | Brown | | 272/70.3 |
| 4,786,069 A | 11/1988 | Tang | | 280/221 |
| 4,790,400 A | 12/1988 | Sheeter | | 180/8.6 |
| 4,790,548 A | 12/1988 | Decelles et al. | | 280/5.26 |
| 4,794,999 A | 1/1989 | Hester | | 180/8.2 |
| 4,798,255 A | 1/1989 | Wu | | 180/65.1 |
| 4,802,542 A | 2/1989 | Houston et al. | | 180/65.5 |
| 4,809,804 A | 3/1989 | Houston et al. | | 180/65.5 |
| 4,834,200 A | 5/1989 | Kajita | | 180/8.1 |
| 4,863,182 A | 9/1989 | Chern | | 280/266 |
| 4,867,188 A | 9/1989 | Reid | | 135/67 |
| 4,869,279 A | 9/1989 | Hedges | | 135/67 |
| 4,874,055 A | 10/1989 | Beer | | 180/19.2 |
| 4,890,853 A | 1/1990 | Olson | | 280/87.021 |
| 4,919,225 A | 4/1990 | Sturges | | 180/210 |
| 4,953,851 A | 9/1990 | Sherlock et al. | | 272/70.3 |
| 4,958,947 A | 9/1990 | Peter et al. | | 384/609 |
| 4,984,754 A | 1/1991 | Yarrington | | 244/2 |
| 4,985,947 A | 1/1991 | Ethridge | | 5/81 |
| 4,998,596 A | 3/1991 | Miksitz | | 180/213 |
| 5,002,295 A | 3/1991 | Lin | | 280/205 |
| 5,011,171 A | 4/1991 | Cook | | 280/221 |
| 5,052,237 A | 10/1991 | Reimann | | 74/335 |
| 5,111,899 A | 5/1992 | Reimann | | 180/65.1 |
| 5,135,063 A | 8/1992 | Kropf | | 180/13 |
| 5,158,493 A | 10/1992 | Morgrey | | 446/355 |
| 5,168,947 A | 12/1992 | Rodenborn | | 180/19.1 |
| 5,171,173 A | 12/1992 | Henderson et al. | | 440/7 |
| 5,186,270 A | 2/1993 | West | | 180/6.62 |
| 5,221,883 A | 6/1993 | Takenaka et al. | | 318/568.12 |
| 5,241,875 A | 9/1993 | Kochanneck | | 74/479 BP |
| 5,248,007 A | 9/1993 | Watkins et al. | | 180/9.32 |
| 5,314,034 A | 5/1994 | Chittal | | 180/21 |
| 5,350,033 A | 9/1994 | Kraft | | 180/167 |
| 5,366,036 A | 11/1994 | Perry | | 180/65.1 |
| 5,376,868 A | 12/1994 | Toyoda et al. | | 318/587 |
| 5,419,624 A | 5/1995 | Adler et al. | | 303/112 |
| 5,439,240 A | 8/1995 | Tichenor et al. | | 280/250.1 |
| 5,487,441 A | 1/1996 | Endo et al. | | 180/181 |
| 5,657,828 A | 8/1997 | Nagamachi | | 180/19.3 |
| 5,701,965 A | 12/1997 | Kamen et al. | | 180/7.1 |
| 5,701,968 A | 12/1997 | Wright-Ott et al. | | 180/65.1 |
| 5,762,351 A | 6/1998 | SooHoo | | 280/267 |
| 5,775,452 A | 7/1998 | Patmont | | 180/181 |
| 5,791,425 A | 8/1998 | Kamen et al. | | 180/7.1 |
| 5,794,730 A | 8/1998 | Kamen | | 180/7.1 |
| 5,971,091 A | 10/1999 | Kamen et al. | | 180/218 |
| 5,973,463 A | 10/1999 | Okuda et al. | | 318/430 |
| 5,975,225 A | 11/1999 | Kamen et al. | | 180/7.1 |
| 5,986,221 A | 11/1999 | Stanley | | 177/136 |
| 6,003,624 A | 12/1999 | Jorgensen et al. | | 180/6.5 |
| 6,039,142 A | 3/2000 | Eckstein et al. | | 180/333 |
| 6,050,357 A | 4/2000 | Staelin et al. | | 180/65.1 |
| 6,059,062 A | 5/2000 | Staelin et al. | | 180/181 |
| 6,125,957 A | 10/2000 | Kauffmann | | 180/65.1 |
| 6,131,057 A | 10/2000 | Tamaki et al. | | 701/22 |
| 6,223,104 B1 | 4/2001 | Kamen et al. | | 701/1 |
| 6,225,977 B1 | 5/2001 | Li | | 345/156 |
| 6,288,505 B1 | 9/2001 | Heinzmann et al. | | 318/139 |
| 6,302,230 B1 | 10/2001 | Kamen et al. | | 180/171 |
| 6,311,794 B1 | 11/2001 | Morrell et al. | | 180/8.3 |
| 6,332,103 B1 | 12/2001 | Steenson, Jr. et al. | | 701/1 |
| 6,357,544 B1 | 3/2002 | Kamen et al. | | 180/218 |
| 6,367,817 B1* | 4/2002 | Kamen et al. | | 280/5.507 |
| 6,405,816 B1* | 6/2002 | Kamen et al. | | 180/65.1 |
| 6,415,879 B2* | 7/2002 | Kamen et al. | | 180/8.2 |
| 6,443,250 B1* | 9/2002 | Kamen et al. | | 180/8.1 |
| 6,538,411 B1 | 3/2003 | Field et al. | | 318/638 |
| 6,553,271 B1 | 4/2003 | Morrell | | 700/75 |
| 6,571,892 B2 | 6/2003 | Kamen et al. | | 180/8.2 |
| 6,581,714 B1 | 6/2003 | Kamen et al. | | 180/333 |
| 6,651,766 B2* | 11/2003 | Kamen et al. | | 180/218 |
| 6,715,845 B2* | 4/2004 | Kamen et al. | | 301/111.03 |
| 6,789,640 B1 | 9/2004 | Arling et al. | | 180/282 |
| 6,799,649 B2* | 10/2004 | Kamen et al. | | 180/8.2 |
| 6,874,591 B2* | 4/2005 | Morrell et al. | | 180/179 |
| 7,004,271 B1 | 2/2006 | Kamen et al. | | 180/21 |
| 7,131,706 B2* | 11/2006 | Kamen et al. | | 301/111.03 |
| 7,273,116 B2* | 9/2007 | Kamen et al. | | 180/21 |
| 7,357,202 B2* | 4/2008 | Kamen et al. | | 180/65.1 |
| 7,370,713 B1* | 5/2008 | Kamen | | 180/7.1 |
| 7,690,447 B2* | 4/2010 | Kamen et al. | | 180/21 |
| 7,708,094 B2* | 5/2010 | Kamen et al. | | 180/65.1 |
| 8,170,780 B2* | 5/2012 | Field et al. | | 701/124 |
| 2001/0032743 A1* | 10/2001 | Kamen et al. | | 180/7.1 |
| 2002/0063006 A1 | 5/2002 | Kamen et al. | | 180/171 |
| 2002/0121394 A1 | 9/2002 | Kamen et al. | | 180/41 |
| 2003/0014167 A1 | 1/2003 | Pedersen et al. | | 701/37 |
| 2003/0058118 A1 | 3/2003 | Wilson | | 340/679 |
| 2003/0141832 A1 | 7/2003 | Field et al. | | 318/139 |
| 2003/0226698 A1 | 12/2003 | Kamen et al. | | 180/65.1 |
| 2006/0249313 A1 | 11/2006 | Kamen et al. | | 180/7.1 |
| 2007/0145697 A1 | 6/2007 | Kamen et al. | | 280/11 |
| 2009/0205880 A1 | 8/2009 | Hammonds | | 180/6.48 |

FOREIGN PATENT DOCUMENTS

| | | | |
|---|---|---|---|
| DE | 2 048 593 | 5/1971 | |
| DE | 31 28 112 A1 | 2/1983 | |
| DE | 32 42 880 A1 | 6/1983 | |
| DE | 3411489 A1 | 10/1984 | |
| DE | 44 04 594 A1 | 8/1995 | |
| DE | 196 25 498 C1 | 11/1997 | |
| DE | 298 08 091 U1 | 10/1998 | |
| DE | 298 08 096 U1 | 10/1998 | |
| DE | 10 2004 033 820 A1 | 11/2005 | |
| EP | 0 109 927 | 7/1984 | |
| EP | 0 193 473 | 9/1986 | |
| EP | 0 537 698 | 4/1993 | |
| EP | 0 958 978 | 11/1999 | |
| EP | 1 980 479 A1 | 10/2008 | |
| FR | 980 237 | 5/1951 | 10/1 |
| FR | 2 502 090 | 9/1982 | |
| FR | 82 04314 | 9/1982 | |
| GB | 2388579 | 0/1903 | |
| GB | 152664 | 2/1922 | |
| GB | 1213930 | 11/1970 | |
| GB | 2 139 576 A | 11/1984 | |

| | | |
|---|---|---|
| JP | 52-44933 | 10/1975 |
| JP | 57110569 | 7/1982 |
| JP | 59-73372 | 4/1984 |
| JP | 62-12810 | 7/1985 |
| JP | 0255580 | 12/1985 |
| JP | 61-31685 | 2/1986 |
| JP | 63-305082 | 12/1988 |
| JP | 21-90277 | 7/1990 |
| JP | 57-87766 | 6/1992 |
| JP | 4201793 | 7/1992 |
| JP | 52-13240 | 8/1993 |
| JP | 6171562 | 6/1994 |
| JP | 6105415 | 12/1994 |
| JP | 7255780 | 3/1995 |
| JP | 2005/145296 | 6/2005 |
| KR | 2002/0069429 | 9/2002 |
| WO | 86/05752 | 10/1986 |
| WO | 89/06117 | 7/1989 |
| WO | 96/23478 | 8/1996 |
| WO | 98/46474 | 10/1998 |
| WO | 00/75001 | 12/2000 |
| WO | 2004/007264 | 1/2004 |
| WO | 2009/028133 | 3/2009 |

OTHER PUBLICATIONS

Schoonwinkel, A., Design and Test of a Computer-Stabilized Unicycle, *Dissertation Abstracts International*, vol. 49/03-B, Stanford University 1988, pp. 890-1294.

Vos, D., *Dynamics and Nonlinear Adaptive Control of an Autonomous Unicycle*, Massachusetts Institute of Technology, 1989.

Vos, D., *Nonlinear Control of an Autonomous Unicycle Robot: Practical Issues*, Massachusetts Institute of Technology, 1992.

Koyanagi et al., A Wheeled Inverse Pendulum Type Self-Contained Mobile Robot and its Posture Control and Vehicle Control, *The Society of Instrument and Control Engineers*, Special Issue of the 31$^{st}$ SICE Annual Conference, Japan, 1992, pp. 13-16.

Koyanagi et al., A Wheeled Inverse Pendulum Type Self-Contained Mobile Robot and its Two Dimensional Trajectory Control, *Proceeding of the Second International Symposium on Measurement and Control in Robotics*, Japan 1992, pp. 891-898.

Koyanagi et al., A Wheeled Inverse Pendulum Type Self-Contained Mobile Robot and its Posture Control and Vehicle Control, *The Society of Instrument and Control Engineers*, Special Issue of the 31$^{st}$ SICE Annual Conference, Japan, 1992, pp. 51-56.

Watson Industries, Inc., Vertical Reference Manual ADS-C132-1A, 1992, pp. 3-4.

Osaka et al., Stabilization of unicycle, *Systems and Control*, vol. 25, No. 3, Japan 1981, pp. 159-166.

Roy et al., Five-Wheel Unicycle System, *Medical & Biological Engineering & Computing*, vol. 23, No. 6, United Kingdom 1985, pp. 593-596.

Vos et al., Dynamics and Nonlinear Adaptive Control of an Autonomous Unicycle—Theory and Experiment, *American Institute of Aeronautics and Astronautics*, A90-26772 10-39, Washington, D.C. 1990, pp. 487-494.

TECKNICO's Home Page, *Those Amazing Flying Machines*, http://www.swiftsite.com/technico. Dated at least May 24, 1999.

*Stew'sHovercraft Page*, http://www.stewcam.com/hovercraft.html. Dated at least May 24, 1999.

Kanoh, Adaptive Control of Inverted Pendulum, *Computrol*, vol. 2, (1983), pp. 69-75.

Yamafuji, A Proposal for Modular-Structured Mobile Robots for Work that Principally Involve a Vehicle with Two Parallel Wheels, *Automation Technology*, vol. 20, pp. 113-118 (1998).

Yamafuji & Kawamura, *Study of Postural and Driving Control of Coaxial Bicycle*, Paper Read at Meeting of Japan Society of Mechanical Engineering (Series C), vol. 54, No. 501, (May 1998), pp. 1114-1121.

Yamafuji et al., *Sychronization and Steering Control of Parallel Bicycle*, Paper Read at Meeting of Japan Society of Mechanical Engineering (Series C), vol. 55, No. 513, (May 1989), pp. 1229-1234.

Momoi & Yamafuji, *Motion Control of the Parallel Bicycle-Type Mobile Robot Composed of a Triple Inverted Pendulum*, Paper Read at Meeting of Japan Society of Mechanical Engineering (Series C), vol. 57, No. 541, (Sep. 1991), pp. 154-159.

Fraser et al., Principles of Continuous Control, Chapter 11, *Electromechanical Engineering: An Introduction*, IEEE Press, (1994), pp. 365-419.

Chinese Patent Application No. 200980151327.6, Notice on the First Office Action (PCT Application in the National Phase) dated Feb. 4, 2013 with English Translation, 24 pages.

\* cited by examiner

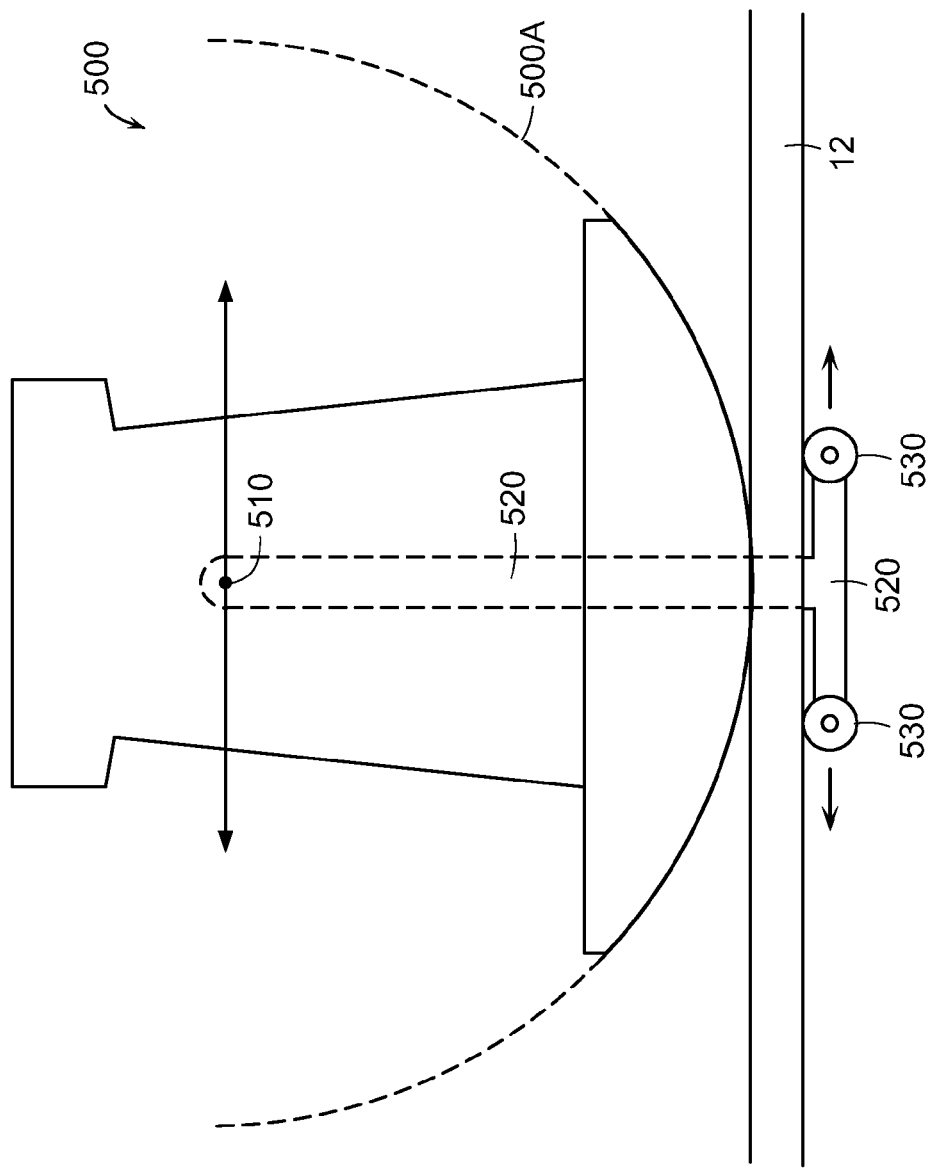

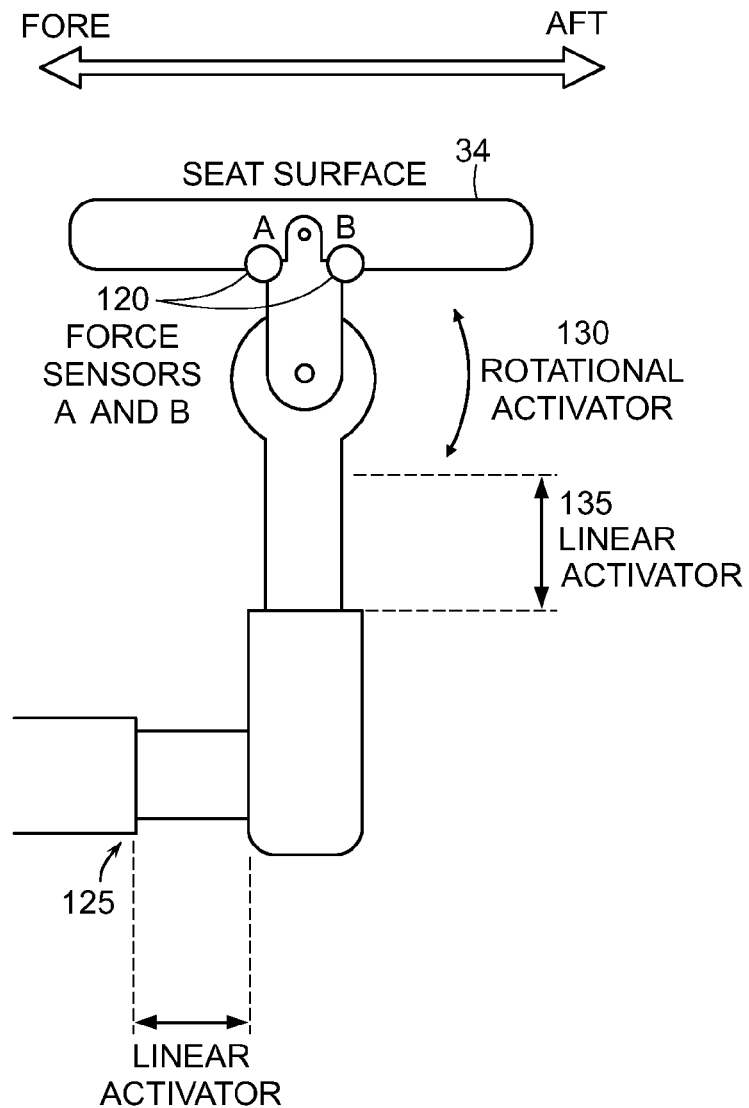
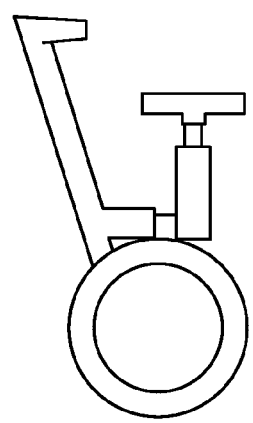
FIG. 8
FIG. 8A

APPARATUS AND METHOD FOR CONTROL OF A VEHICLE

RELATED APPLICATIONS

This application is a continuation of U.S. patent application Ser. No. 12/266,170 filed Nov. 6, 2008, the entire content of which is incorporated herein by reference.

FIELD OF THE INVENTION

The present invention pertains to control of vehicles, and in particular, controlling vehicle motion.

BACKGROUND OF THE INVENTION

A wide range of vehicles and methods are known for transporting human subjects. Typically, such vehicles rely upon static stability and are designed for stability under all foreseen conditions of placement of their ground-contacting members with an underlying surface. For example, a gravity vector acting on the center of gravity of an automobile passes between the points of ground contact of the automobile's wheels and the suspension of the automobile keeps all wheels on the ground at all times making the automobile stable. Although, there are conditions (e.g., increase or decrease in speed, sharp turns and steep slopes) which cause otherwise stable vehicles to become unstable.

A dynamically stabilized vehicle, also known as a balancing vehicle, is a type of vehicle that has a control system that actively maintains the stability of the vehicle while the vehicle is operating. In a vehicle that has only two laterally-disposed wheels, for example, the control system maintains the fore-aft stability of the vehicle by continuously sensing the orientation of the vehicle, determining the corrective action necessary to maintain stability, and commanding the wheel motors to make the corrective action. If the vehicle losses the ability to maintain stability, such as through the failure of a component or a lack of sufficient power, the human subject can experience a sudden loss of balance.

For vehicles that maintain a stable footprint, coupling between steering control and control of the forward motion of the vehicles is less of a concern. Under typical road conditions, stability is maintained by virtue of the wheels being in contact with the ground throughout the course of a turn and while accelerating and decelerating. In a balancing vehicle with two laterally disposed wheels, however, any torque applied to one or more wheels affects the stability of the vehicle.

In prior art systems, such as the self balancing vehicles shown in U.S. Pat. No. 5,871,091 personal vehicles may be self-propelled and user-guidable, and, further, may entail stabilization in one or both of the fore-aft or left-right planes, such as when no more than two wheels are in ground contact at a time. Vehicles of this sort may be operated in a mode in which motion of the vehicle, including acceleration (both linear and turning), is commanded partially or entirely by leaning of the vehicle as caused by a subject riding the vehicle. Several such vehicles are described in U.S. application Ser. No. 08/384,705 which is incorporated herein by reference.

Such balancing vehicles may lack static stability. Referring, for example, to FIG. 1A, wherein a prior art personal transporter is shown and designated generally by numeral 18, a subject 10 stands on a support platform 12 and holds a grip 14 on a handle 16 attached to the platform 12, so that the vehicle 18 of this embodiment may be operated in a manner analogous to a scooter. A control loop may be provided so that leaning of the subject results in leaning of the platform which, in turn, results in the application of torque to wheel 20 about axle 22 thereby causing an acceleration of the vehicle. Vehicle 18, however, is statically unstable, and, absent operation of the control loop to maintain dynamic stability, subject 10 will no longer be supported in a standing position and can fall from platform 12. Another prior art balancing vehicle is shown in FIG. 1B and designated generally by numeral 24. Personal vehicle 24 shares the characteristics of vehicle 18 of FIG. 1A, namely a support platform 12 for supporting subject 10 and grip 14 on handle 16 attached to platform 12, so that the vehicle 24 of this embodiment may also be operated in a manner analogous to a scooter. FIG. 1B shows that while vehicle 24 may have clusters 26 each having a plurality of wheels 28, vehicle 24 remains statically unstable and, absent operation of a control loop to maintain dynamic stability, subject 10 will no longer be supported in a standing position and may fall from platform 12.

A standing rider 10 of the vehicle 30 places his feet on the platform and shifts weight back and forth in a relatively wide and flat path 33. The slight amount of strength that is needed to resist gravity and inertia in transversing this arc is well within the strength and coordination of an average user's muscles. The center of gravity of the vehicle and rider 35 moves in an arcuate fashion as the rider leans either forward or backward. When a seat is added to such a vehicle, movement of the center of gravity in the manner described above may no longer be possible and an alternative mechanism for shifting the center of gravity is required. The mechanism needs to provide adequate range of motion while allowing the rider to resist gravity and inertia.

SUMMARY OF THE INVENTION

The invention, in one aspect, features a vehicle for transporting a payload over a surface. The vehicle includes a support for supporting a payload and an enclosure for at least partially enclosing the payload. The vehicle also includes two laterally disposed ground-contacting elements (e.g., wheels, tracks, rollers, legs) coupled to at least one of the enclosure or the support. The vehicle also includes a drive coupled to the ground-contacting elements. The vehicle also includes a controller coupled to the drive, for governing the operation of the drive at least in response to the position of the center of gravity of the vehicle to dynamically control balancing of the vehicle.

In some embodiments, the drive propels the ground-contacting elements along the ground. In some embodiments, the enclosure is coupled to the support. In some embodiments, the vehicle includes a structure coupling the support and the enclosure to the ground-contacting elements, the structure allows for variation in the position of the center of gravity. In some embodiments, the position of the center of gravity varies in one or more of the fore-aft, lateral and vertical planes of the vehicle. In some embodiments, the structure includes rails allowing the enclosure and support to slide with respect to the ground-contacting elements. In some embodiments, the structure includes a pivot mechanism coupling the support and enclosure to the ground-contacting elements allowing the enclosure and support to pivot with respect to the ground-contacting elements.

In some embodiments, the payload is a human subject and the vehicle includes an input device, the human subject pushes or pulls the input device allowing the human subject, support and enclosure to move with respect to the ground-contacting elements.

In some embodiments, the vehicle includes one or more (e.g., two) four-bar linkages, each four-bar linkage coupling a ground-contacting element to the support and the enclosure, allowing the enclosure and support to move relative to the ground-contacting elements. In some embodiments, the enclosure is coupled to the ground-contacting elements.

In some embodiments, the vehicle includes a structure coupling the support to the enclosure and ground-contacting elements, the structure allows for variation in the position of the center of gravity. In some embodiments, the structure includes rails allowing the support to slide (e.g., fore and aft) with respect to the enclosure and the ground-contacting elements. In some embodiments, the structure includes a pivot mechanism coupling the support to the enclosure and ground-contacting elements, allowing the support to pivot with respect to the enclosure and ground-contacting elements.

In some embodiments, the vehicle includes two four-bar linkages, each four-bar linkage coupling the support to the enclosure and the ground-contacting elements, and allowing the support to move relative to the ground-contacting elements. In some embodiments, the payload is a human subject and the structure includes an input device, the human subject pushes or pulls relative to the input device allowing the human subject and support to move with respect to the enclosure and ground-contacting elements.

In some embodiments, the vehicle includes an actuator that controls the position of the center of gravity of one or more of the support, payload or enclosure relative to the ground-contacting elements. In some embodiments, the vehicle is controlled based on a selected operation mode. In some embodiments, the operation mode is a remote controlled mode or the payload is a human subject and the operation mode is a human subject controlled mode. In some embodiments, the payload is a human subject that applies pressure on a foot member coupled to the vehicle (e.g., platform, support or enclosure) to decelerate the vehicle. In some embodiments, the human subject applies pressure on the foot member coupled to the vehicle to accelerate the vehicle.

In some embodiments, a shift of the position of the center of gravity rearward causes a deceleration (e.g., if initially moving forward) of the vehicle. In some embodiments, a shift of the position of the center of gravity rearward causes a rearward acceleration (e.g., if initially stopped or moving rearward) of the vehicle. In some embodiments, a shift of the position of the center of gravity forward causes a forward acceleration of the vehicle. In some embodiments, a shift of the position of the center of gravity forward causes a deceleration of the vehicle when initially traveling rearward. In some embodiments, the vehicle includes a stabilizer ground-contacting element positioned on the vehicle to statically stabilize the vehicle (e.g., when not being dynamically stabilized). In some embodiments, the stabilizer ground-contacting element is retractable. In some embodiments, the stabilizer ground-contacting element includes a sensor for detecting at least one of the a) stabilizer ground-contacting element contacting the ground or b) force applied between the stabilizer ground-contacting element and the ground. In some embodiments, the stabilizer ground-contacting element includes one or more wheels, skids, balls or posts.

In some embodiments, the vehicle includes one or more sensors for detecting a change in the position of the center of gravity of the vehicle. In some embodiments, the one or more sensors is one or more of a force sensor, position sensor, pitch sensor or pitch rate sensor.

In some embodiments, a start mode that is triggered by a change in the position of the center of gravity of the vehicle, the change in the position of the center of gravity initiating dynamic stabilization of the balancing vehicle such that the vehicle is no longer stabilized by a stabilizer ground-contacting element. In some embodiments, the stabilizer ground-contacting element is positioned towards the front of the vehicle and the position of the center of gravity shifts rearward to, for example, trigger a start mode. In some embodiments, the stabilizer ground-contacting element is positioned rearward of the vehicle and the position of the center of gravity shifts forward to, for example, trigger a start mode. In some embodiments, a shift of the position of the center of gravity of the vehicle beyond a threshold triggers a stop mode that decelerates the vehicle.

In some embodiments, the payload is a human subject and the vehicle includes an input device, the input device coupled to the vehicle by a linkage such that the vehicle accelerates forward (or decelerates rearward) when the human subject pushes the input device forward and the vehicle decelerates forward (or accelerates rearward) when the human subject pulls the input device rearward.

In some embodiments, the drive delivers power to the ground-contacting elements to cause rotation of the ground-contacting elements to dynamically control balancing of the vehicle. In some embodiments, the drive is a motorized drive. In some embodiments, the drive moves the ground-contacting elements fore and aft of the vehicle to dynamically control balancing of the vehicle.

In some embodiments, the vehicle includes a second drive for delivering power to the ground-contacting elements to propel (e.g., cause rotation of the ground-contacting elements) the vehicle for and aft. In some embodiments, the vehicle includes an internal combustion engine, pedal, or crank coupled to the second drive for delivering power to the ground-contacting elements to, for example, cause rotation of the ground-contacting elements to propel the vehicle for and aft The invention, in another aspect, features a method for transporting a payload over a surface with a vehicle. The method involves supporting a payload with a support and at least partially enclosing the support with an enclosure. The method also involves controlling operation of a drive in response to position of the center of gravity of the vehicle to dynamically control balancing of the vehicle, wherein the drive is coupled to two laterally disposed ground-contacting elements coupled to at least one of the enclosure or support.

In some embodiments, the delivered power is in response to attitude (e.g., pitch) of the vehicle. In some embodiments, the enclosure is coupled to the support and the support and enclosure move relative to the ground-contacting elements to change the position of the center of gravity of the vehicle. In some embodiments, the enclosure is coupled to the ground-contacting elements and the support moves relative to the enclosure and ground-contacting elements to change the position of the center of gravity of the vehicle. In some embodiments, the support and enclosure slide relative to the ground-contacting elements. In some embodiments, the support slides relative to the enclosure and the ground-contacting elements. In some embodiments, the support and enclosure pivot relative to the ground-contacting elements. In some embodiments, the support pivots relative to the enclosure and the ground-contacting elements.

In some embodiments, the method involves applying pressure to a foot member coupled to the vehicle to decelerate the vehicle. In some embodiments, the method involves shifting the position of the center of gravity rearward to cause a deceleration of the balancing vehicle. In some embodiments, the method involves shifting the position of the center of gravity forward to cause an acceleration of the balancing vehicle. In some embodiments, the method involves shifting the center of gravity rearward to cause an acceleration of the balancing vehicle. In some embodiments, the method involves stabilizing the balancing vehicle with a stabilizer ground-contacting element positioned on the vehicle. In some embodiments, the method involves retracting the stabilizer ground-contacting element when the vehicle is dynamically balanced.

In some embodiments, the method involves triggering a start mode when a sensor mounted on the vehicle detects a change in the position of the center of gravity shift and initiating dynamic stabilization of the vehicle. In some embodiments, the method involves shifting the position of the center of gravity rearward to initiate dynamic stabilization of the vehicle. In some embodiments, the method involves shifting the position of the center of gravity forward to initiate dynamic stabilization of the vehicle. In some embodiments, the method involves triggering a stop mode of the vehicle by shifting the position of the center of gravity of the vehicle beyond a threshold and decelerating the balancing vehicle.

In some embodiments, the method involves applying pressure to a foot member coupled to at least one of the platform or enclosure to move the position of the center of gravity rearward. In some embodiments, the relative position of the payload to the ground-contacting elements is an input to the controller. In some embodiments, the input is added to or subtracted from commanded acceleration or deceleration of the vehicle by changing desired pitch of the vehicle and shifting the position of the center of gravity of the vehicle. In some embodiments, the input modifies desired pitch of a speed limiting algorithm used to control speed of the vehicle.

In some embodiments, the method involves delivering power from the drive to the ground-contacting elements to cause rotation of the ground-contacting elements to dynamically control balancing of the vehicle. The method also involves the drive moves the ground-contacting elements fore and aft of the vehicle to dynamically control balancing of the vehicle. In some embodiments, the method includes delivering power from a second drive to the ground-contacting elements to cause rotation of the ground-contacting elements to move the vehicle fore and aft.

The invention, in another aspect, features a vehicle for transporting a payload over a surface. The vehicle includes a support for supporting a payload and an enclosure for at least partially enclosing the payload. The vehicle also includes two laterally disposed ground-contacting elements coupled to at least one of the enclosure or the support. The vehicle also includes a drive coupled to the ground-contacting elements. The vehicle also includes means for governing the operation of the drive at least in response to position of the center of gravity and/or tiling of the vehicle to dynamically control balancing of the vehicle.

The invention, in another aspect, features a vehicle for transporting a payload over a surface. The vehicle includes a support for supporting a payload and an enclosure for at least partially enclosing the payload. The vehicle also includes two laterally disposed ground-contacting elements coupled to at least one of the enclosure or the support. The vehicle also includes a first drive coupled to the ground-contacting elements. The vehicle also includes a controller coupled to the first drive, for governing the operation of the first drive at least in response to the position of the center of gravity of the vehicle to move the ground-contacting elements fore and aft of the vehicle to dynamically control balancing of the vehicle. The vehicle also includes a second drive coupled to the ground-contacting elements to deliver power to the ground-contacting elements to propel the vehicle for and aft.

In some embodiments, the vehicle includes an internal combustion engine coupled to the second drive for delivering power to the ground-contacting elements. In some embodiments, the vehicle includes rails coupled to the ground-contacting elements allowing the first drive to command the ground-contacting elements to move fore and aft of the vehicle to dynamically control balancing of the vehicle.

The invention, in another aspect, features a method for transporting a payload over a surface with a vehicle. The method involves supporting a payload with a support and at least partially enclosing the support with an enclosure. The method also involves controlling operation of a first drive, coupled to at least one of the enclosure or support, in response to position of the center of gravity of the vehicle to move the ground-contacting elements fore and aft of the vehicle to dynamically control balancing of the vehicle. The method also involves controlling operation of a second drive coupled to the two laterally disposed ground-contacting elements to deliver power to the ground-contacting elements to propel the vehicle fore and aft.

The invention, in another aspect, features a device for transporting a human subject over a surface is disclosed. The device is a dynamically balancing vehicle having a control loop for providing balance. The device includes a platform defining a fore-aft plane. The platform supports a payload including the human subject. A ground-contacting module is included which may be one or more wheels. The ground-contacting member is movably coupled to the platform. The device and any load on the device have a center of gravity that is defined with respect to the ground-contacting member. The device further includes a support. The support may be a seat for supporting the subject and the support is coupled to the platform in such a manner as to permit variation of the position of the center of gravity in the fore-aft plane by translation and rotation of at least a portion of the support. The translation and rotation of at least a portion of the support are mechanically coupled in one embodiment.

The transportation device further includes a drive which is coupled to the ground-contacting module and which delivers power to the ground-contacting module in a manner responsive to the position of the center of gravity. The drive supplies force so as to balance the vehicle. In one embodiment, the support rotates about a virtual pivot point which lies above the support. The structure of the support allows the support to rock about an arc or other path.

The support may include a mechanical linkage such as a four-bar linkage. In one embodiment, each bar of the four-bar linkage is coupled together with pivots. A structure (e.g., a fifth bar) may be included for holding a seat. The structure is attached at one of the pivots of the four-bar linkage. In another embodiment, the structure is attached to one of the bars of the four-bar linkage. In one embodiment, the four-bar linkage forms a parallelogram and changes shape as a user of the vehicle moves on the seat shifting the center of gravity.

In one embodiment, the device includes pressure sensors for activating the drive and causing the control loop to become active when the driver or payload is present. The pressure sensors may be placed in the platform for activation or the pressure sensors may be placed in the seat. In yet another embodiment, a mechanical contact is attached to the support which contacts the pressure sensors that are coupled to the platform.

In another embodiment of the invention, the support includes a seat that is slideably mounted. The support includes one or more rails for allowing the seat to slide. The seat need not be capable of rotation about a pitch axis of the vehicle in such an embodiment, but does allow for the user to change the center of gravity for controlling the vehicle. In another variation of the sliding seat, the sliding seat does rotate about the pitch axis of the vehicle. As the seat slides along the rails a mechanism causes the seat to rotate about the pitch axis of the vehicle. In one embodiment, the rails include one or more sprockets that engage with protrusions that are coupled to the seat and thus cause rotation as the seat is rolled on the rails. In another embodiment, the support may include one or more pulleys that assist the seat in sliding along the one or more rails. In yet another embodiment, the seat is coupled to friction wheels that ride on a friction surface.

In one embodiment, the support includes a convex radial base that allows the support to rock in response to a user shifting his weight. The convex radial base may be coupled to the platform at a pivot point that translates fore and aft with the motion of the seat. In other embodiments, the convex radial base may have different radii of curvature along its convex surface.

In certain embodiments, the support may include a damper to resist motion of the slide and damp unwanted control system oscillations. In one embodiment, the support preferably returns to a position, such that the vehicle remains substantially stationary when no force is applied to the support. In such an embodiment, the vehicle may still move slightly as the control loop balances the vehicle.

In some embodiments, a controller is either coupled to the drive or part of the drive and the controller is part of a control loop which is responsive to changes in the tilt angle of the vehicle. In certain embodiments, the seat may be coupled to the platform by a universal pivot. In another embodiment, the seat is coupled to a control stalk.

BRIEF DESCRIPTION OF THE DRAWINGS

The foregoing features of the invention will be more readily understood by reference to the following detailed description, taken with reference to the accompanying drawings, in which:

FIG. 6C shows the support structure coupled to the platform about a pivot point.

FIGS. 8 and 8A show an embodiment of a support structure which includes both translational and rotational mechanical actuators.

DETAILED DESCRIPTION OF ILLUSTRATIVE EMBODIMENTS

Figure 1A:
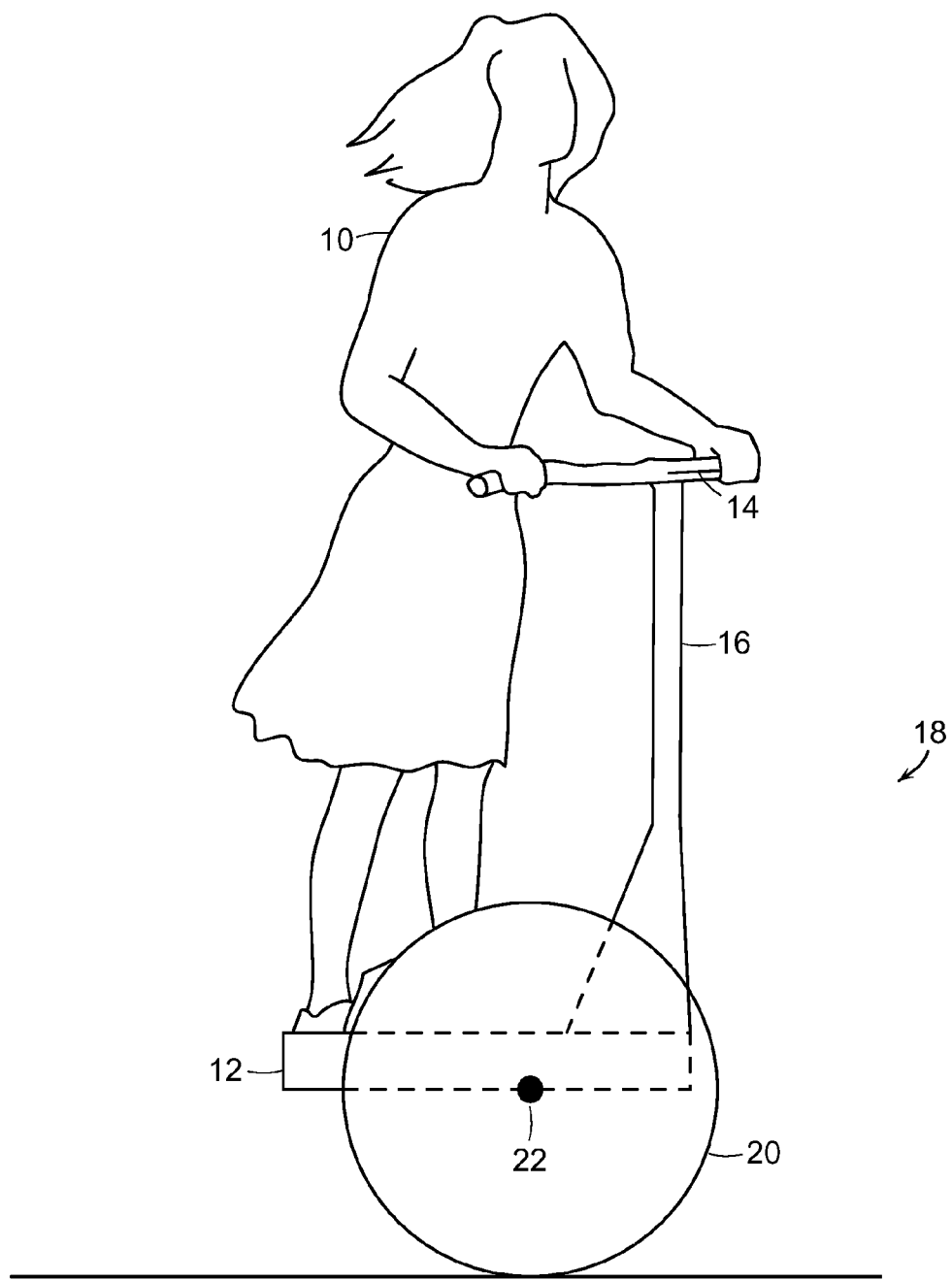
FIG. 1A is a side view of a prior art dynamically balancing vehicle of the type of which an embodiment of the invention may be advantageously employed.
Figure 1B:
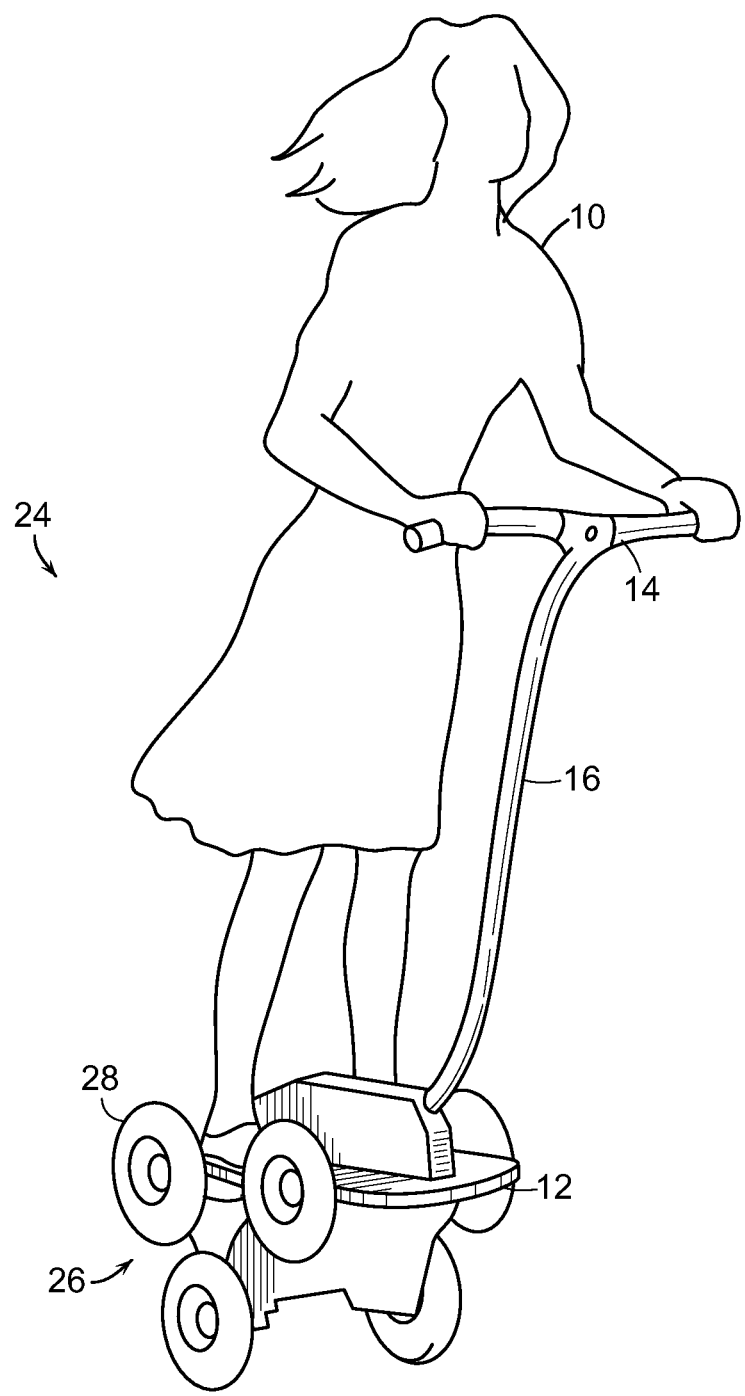
FIG. 1B is a side view of a further prior art dynamically balancing vehicle of the type of which an embodiment of the invention may be advantageously employed.
Figure 2B:
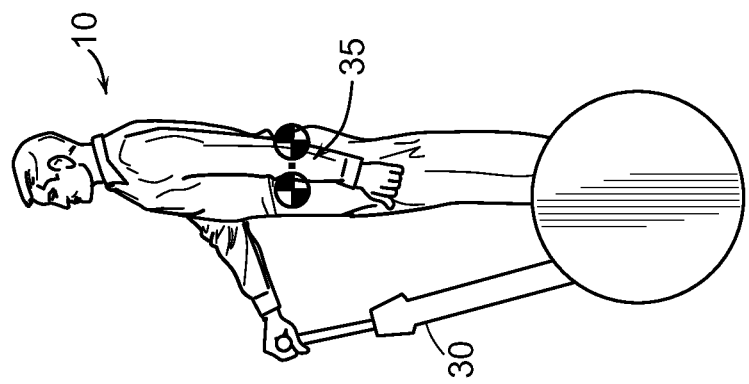
FIGS. 2A and 2B are a prior art dynamically balancing vehicle having a platform that rotates in an arc.
Figure 2A:
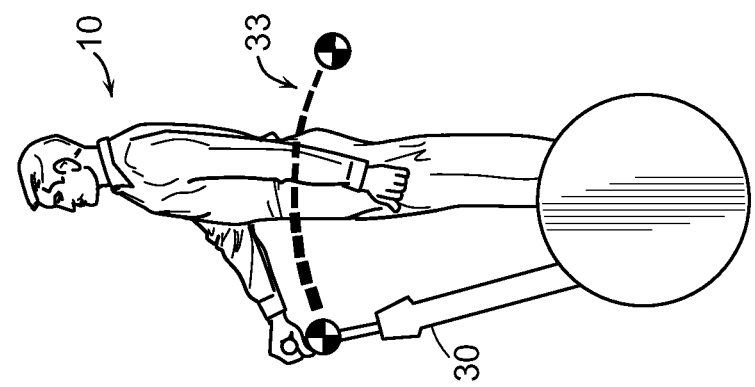
Figure 3:
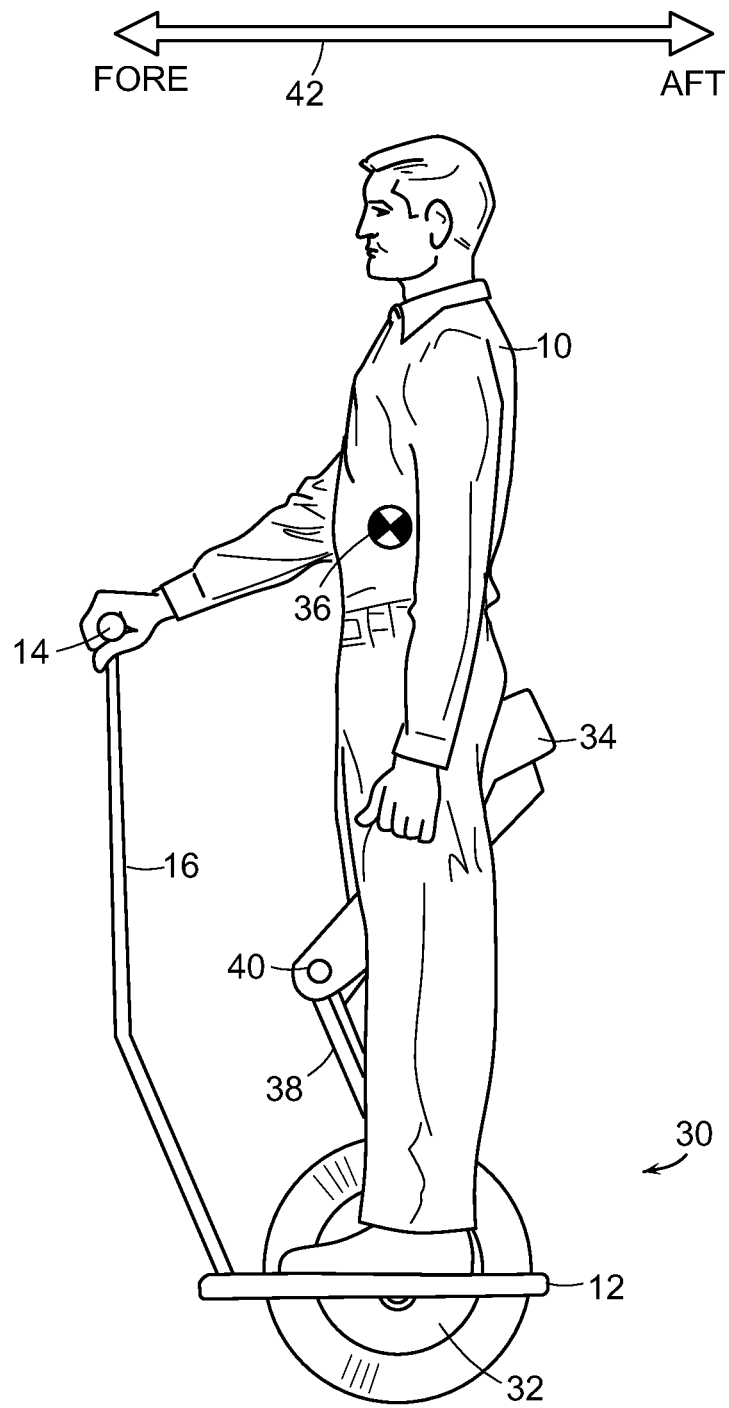
FIG. 3 shows a dynamically balancing vehicle having a seat.

A balancing vehicle is shown in FIG. 3. The balancing vehicle includes a ground-contacting module 32 which, in the embodiment that is shown, is a pair of co-axial wheels powered by motors. A controller is coupled to the motor for providing a control signal in response to changes in the center of gravity of an assembly that includes the vehicle along with a rider. As the rider 10 mounts the vehicle, the controller module senses the change in the center of gravity 36 and controls power to the wheels 32 based upon changes to the center of gravity 36 about a fore-aft plane 42 using a control loop. As the center of gravity 36 moves forward in the fore direction, power is provided to the wheels and the vehicle will move forward. As the center of gravity moves in the aft direction in response to the movement of the rider, the vehicle will slow and reverse direction such that the vehicle moves in the aft direction. As a change in the center of gravity is sensed, torque is applied to one or more the wheels (or other ground-contacting members) of the vehicle by operation of the control loop and a wheel actuator (not shown).

The pitch of the vehicle may also be sensed and compensated for in the control loop. The control module includes gyroscopes for sensing changes in the position of the center of gravity. The vehicle that is shown includes a platform 12 for supporting the rider and a control stalk 14 and 16. Appropriate force transducers may be provided to sense leftward and rightward leaning and related controls provided to cause left and right turning as a result of the sensed leaning. The leaning may also be detected using proximity sensors. Similarly, the vehicle of this embodiment may be equipped with a foot- (or force-) actuated switch located on the platform 12 to activate the vehicle, in such a manner that the switch is closed so as to power the vehicle automatically when the subject contacts the platform 12. This embodiment further includes a support 34, 38, 40 for the rider; the support may include a seat 34 on which the rider can rest.

Figure 3A:
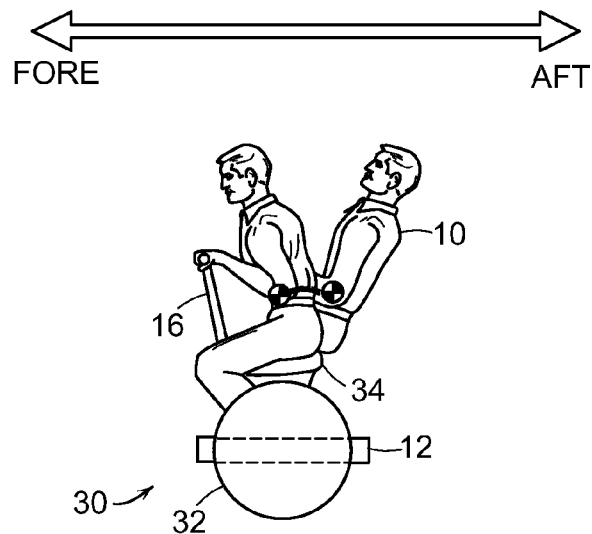
FIG. 3A shows a dynamically balancing vehicle in which the seat is coupled to a control stalk.
Figure 3B:
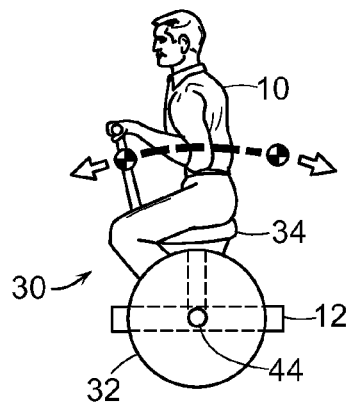
FIG. 3B shows a dynamically balancing vehicle in which the seat is coupled to the platform by a pivot.

In a first embodiment, the seat 34 is attached to the control stalk 16 as shown in FIG. 3A. The rider 10 then uses his body and momentum to move the center of gravity of the combination of the vehicle and the rider in either a forward or in an aft direction. In another embodiment, the seat 34 is attached to the platform 12 via a pivot point 44 as shown in FIG. 3B. The pivot may be a simple pivot such that the pivot moves only in the fore and aft directions or the pivot may be a universal pivot so that the seat may pivot in any direction. One example of a universal pivot is a spring. Further, the pivot may be mounted to the platform along the axis of the wheels, or the pivot may be mounted at other locations such as along the rear edge of the platform.

Figure 3C:
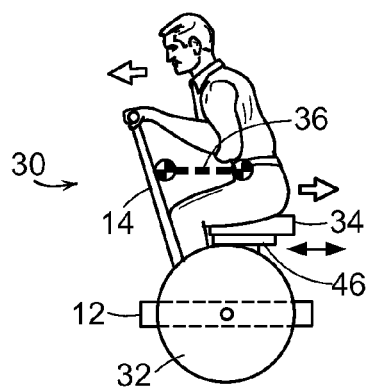
FIG. 3C shows a dynamically balancing vehicle in which the seat is slideably mounted.
Figure 3D:
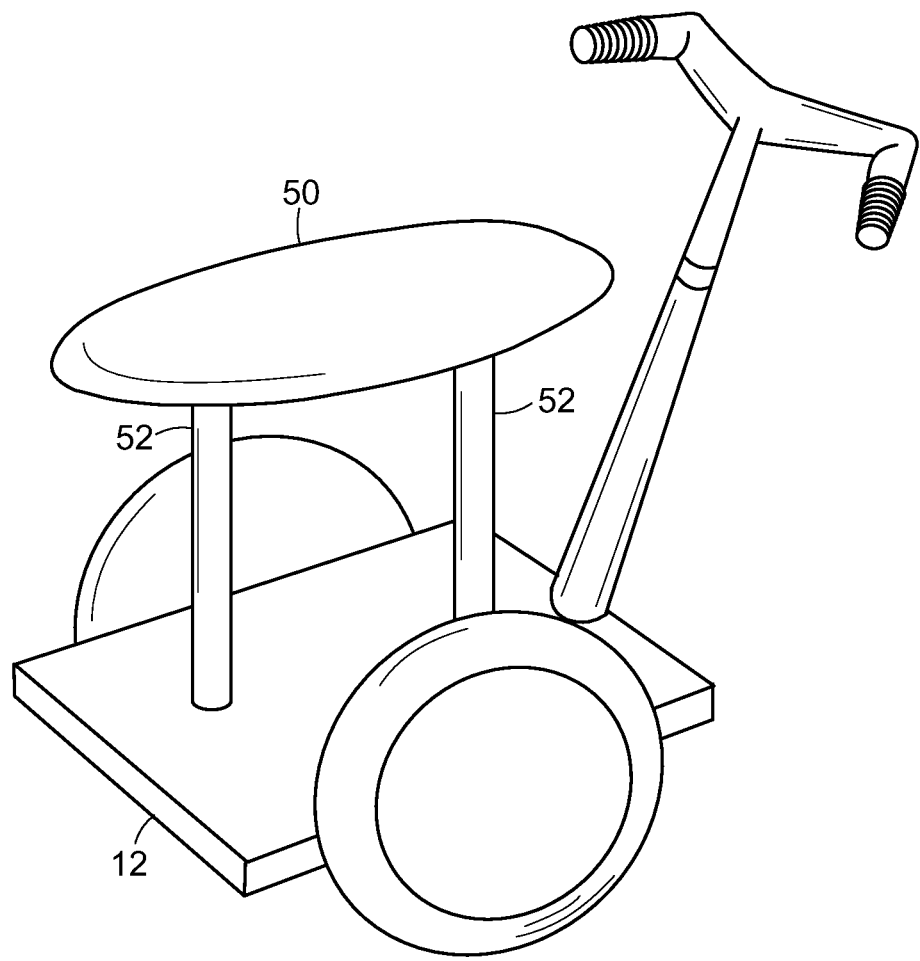
FIG. 3D shows a dynamically balancing vehicle having a seat.

In yet another embodiment, a seat is attached to the platform using one or more rails 46 on which the seat 34 slides as shown in FIG. 3C. In such an embodiment, the movement of the seat 34 by the rider causes a change in the position of the center of gravity of the vehicle and its load. If the seat is moved in the fore direction sensors sense the resulting tilt of the vehicle and cause the vehicle to increase in speed in the fore direction. If the seat is slid in the aft direction, the vehicle 30 will slow down correspondingly. In certain embodiments of the invention, a centering mechanism, such as, a spring may be incorporated with either the pivot or sliding seat, so the seat will return to a position such that the vehicle is substantially stationary when a rider disengages from the vehicle. In another embodiment, as shown in FIG. 3D, a seat 50 is mounted to the platform 12. The seat and the linkage 52 to the platform do not include a pivot. The seat in this embodiment preferably extends the length of the platform. When a rider engages the vehicle and sits on the seat, the rider may adjust the center of gravity by sliding her body along the length of the seat.

Figure 4C:
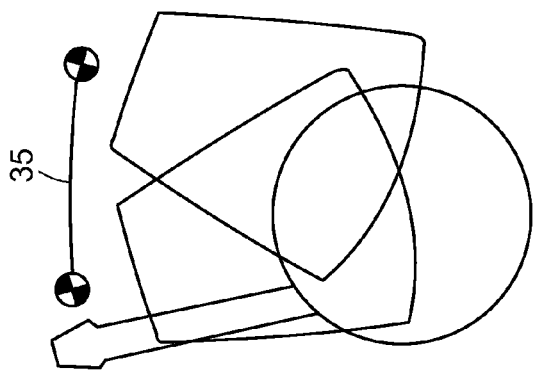
FIG. 4C shows that the four-bar linkage simulates a rocking motion such that there is translation and rotation of the seat.
Figure 4B:
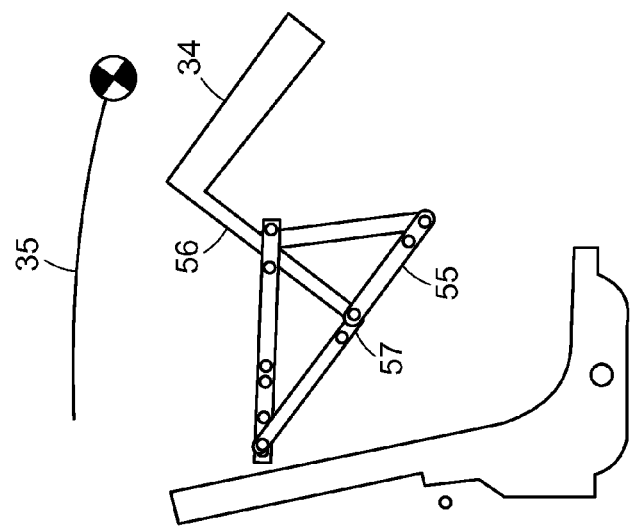
FIG. 4B shows one position of the four-bar linkage as would occur if a rider leaned backwards shifting the center of gravity in the aft direction.
Figure 4A:
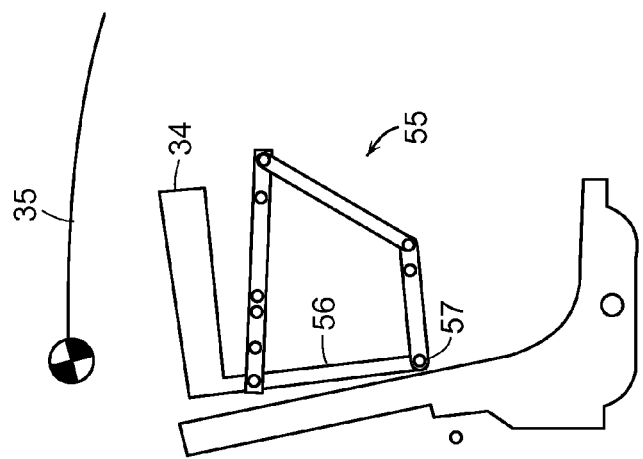
FIG. 4A shows the seat of the dynamically balancing vehicle mounted on a four-bar linkage.
Figure 4D:
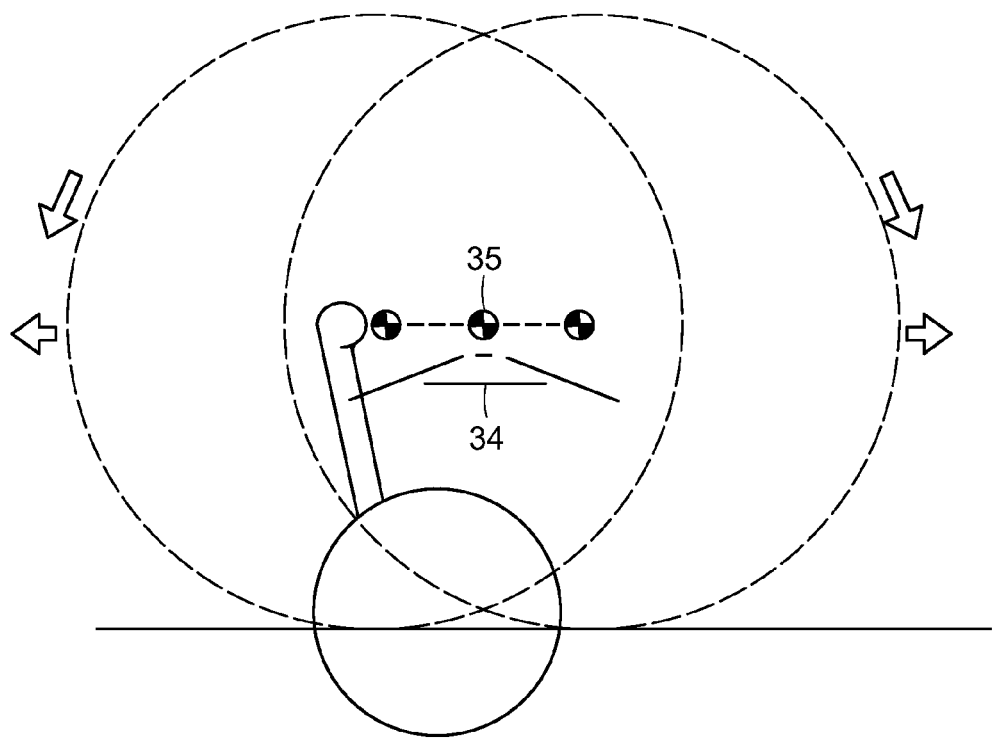
FIG. 4D shows the center of gravity translating in a straight line while the seat both translates and rotates.

In a further embodiment, the vehicle includes a bar linkage mechanism, such as a four-bar linkage, that is attached to the control stalk as shown in FIG. 4A. The four-bar linkage mechanism is also attached to a seat by another bar (seat post) which is coupled to the four-bar linkage about a common pivot point of the four-bar linkage or coupled to a bar in the linkage. The four-bar linkage mechanism allows the seat to move in an arc which simulates a rocking motion similar to that of a rocking chair about the base platform as shown in FIG. 4C. FIG. 4B shows one position of the four-bar linkage 55 as would occur if a rider leaned backwards shifting the center of gravity in the aft direction. The rider both moves in the aft direction and also rotates in the aft direction and as such both, translation and rotation are coupled together. Viewed in another way, the four-bar linkage allows the seat to move in an arc about a virtual pivot point. The virtual pivot point can be located at a point above the seat. In other embodiments, the virtual pivot point may be located below the seat. As the seat 34 both translates and rotates the center of gravity 35 moves in a straight line in the fore-aft plane as shown in FIG. 4D.

In other embodiments, the center of gravity need not move in a straight line and the position of the center of gravity may vary. The motion of the seat creates a rider experience that is different from the seats discussed above in FIGS. 3A-3D. In this embodiment, there is no position that the seat automatically returns to. As such, there are no peaks or wells in terms of the amount of energy that is required to move the center of gravity. In this embodiment, no arm force is required to maintain a position of the center of gravity relative to the wheel axis as is the case with simple and universal pivots as shown in FIGS. 3A-3C. This allows both ease of pitch control and the ability of the rider to find the center of gravity position above the axle of the vehicle so that the vehicle is substantially stationary. The virtual pivot mechanism allows the seated rider, to have a similar experience on the dynamically balancing vehicle that a standing rider would have.

In the version of the vehicle described with respect to FIGS. 4A-4E, the control stalk is held by the rider by a pair of hand grips that extend from the control stalk. As a rider sits on the seat, the seat can move about the fore-aft plane and the seat will both shift and rotate when the rider moves, thus changing the center of gravity.

Although the embodiment, shown above has a linkage mechanism for providing the coupling of rotation and translation, other structures and systems could also be designed to provide this functionality such as those shown in, but not limited to FIGS. 5A-E and FIGS. 6, 6A, 6B, and 6C and the present invention are not intended to be limited to mechanical linkages.

Figure 4E:
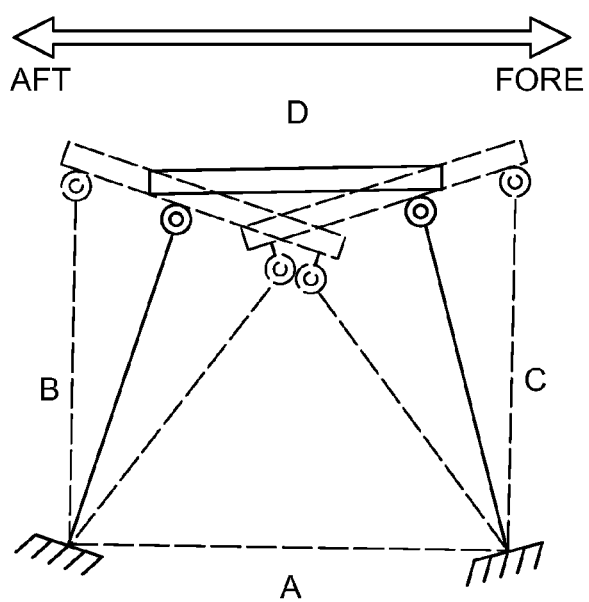
FIG. 4E shows a bar linkage mechanism for translation and rotation wherein one or more bars are flexible.

In a further embodiment, the four-bar linkage includes non-rigid members that can flex. For example, FIG. 4E shows a support structure where members B and C each flex and member D is rigid as are the couplings of members B and C to platform A. In this embodiment members B and C are shown such that the two members lean inwards to meet member D. As force is placed on the seat through member D by the rider in the fore-aft direction, the members B and C will flex such that the seat will move in a rocking motion about a virtual pivot point that lies above the seat. The motion of members B and C is shown in FIG. 4E by the dotted lines. As such, member D which supports the seat will both translate and rotate. Further, pivots may be included in such an embodiment, so that the linkage both pivots and flexes. For instance, pivots may be placed at the point where member D comes into contact with members B and C as shown in the figure. In still another variation, members B and C may be positioned so rather than leaning inward, the two members are outward leaning. In this type of embodiment, the seat will move much like a rocking chair. If a rider leans in the fore direction the seat will translate in the fore direction and the seat will rotate such that the fore-most part of the seat will be lower than the aft-most part of the seat. This is different from the embodiment that is shown in FIG. 4E wherein if a rider causes the seat to translate in the fore direction, the seat will rotate such that the fore-most part of the seat is elevated as compared to the aft-most part of the seat.

Figure 5A:
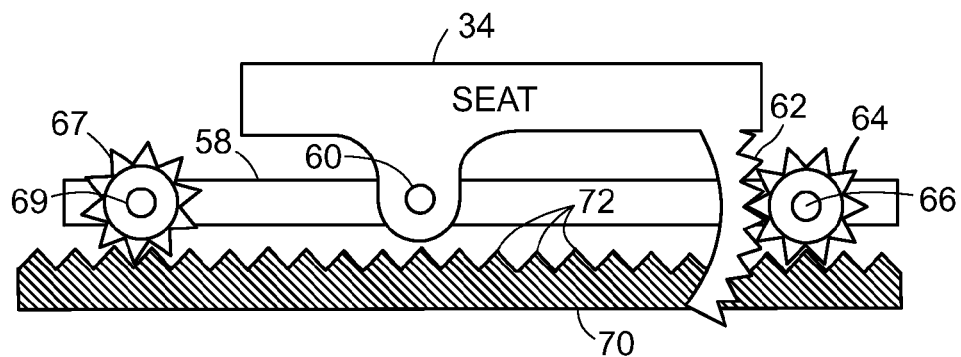
FIG. 5A is an embodiment of the dynamically balancing vehicle in which the seat is attached to a bar via a pivot.

FIGS. 5A-5E each show different embodiments in which both translation and rotation are coupled. In FIG. 5A the seat 34 is attached to a bar 58 via a pivot 60. The seat further includes a series of protrusions 62 formed in an arc which mesh with a sprocket 64. The sprocket 64 is attached to the bar 58 and can spin about an axis 66. The bar includes a second sprocket 67 which can rotate about a central axis 69. The sprockets 64, 67 each reside on a strip/track 70 that includes protrusions 72 that mesh with the sprockets 64, 67. As a user of the vehicle moves the seat in a fore or aft direction the seat will translate and rotate due to the protrusions 62 that are formed in an arc and which are coupled to the seat. In other embodiments, the track on which the seat slides may have a different profile. For example, the track may be convex, concave, or have a varying profile along its length. If the track has a varying profile, the rider needs to apply more force to move the seat along certain portions of the track. Thus, different track profiles may be employed in order to shape the path of the center of gravity and the center of gravity need not move in a straight line.

Figure 5B:
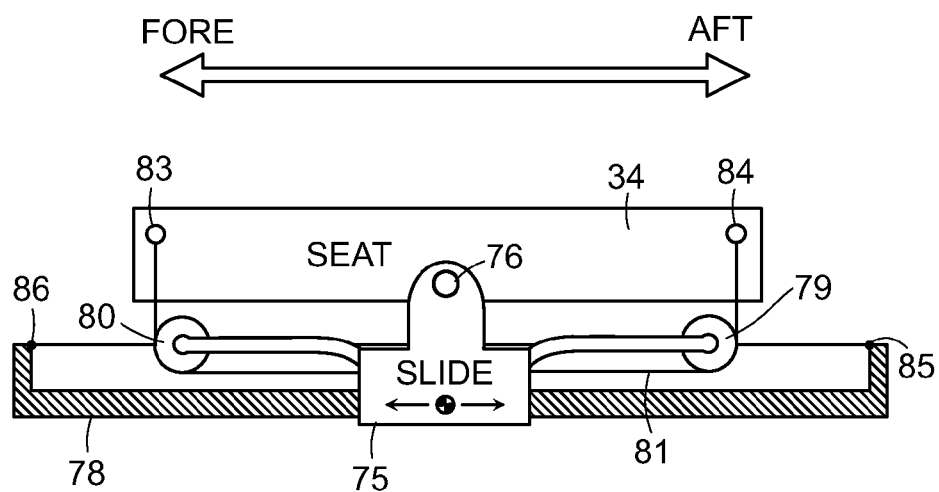
FIG. 5B is an embodiment that shows the seat attached to a slider about a pivot point wherein pulleys help to control rotation.

In FIG. 5B the seat 34 attaches to a slider 75 about a pivot point 76. The slider fits on a rail 78 and the slider 75 can slide on the rail 78. Attached to the slider at the seat are at least two pulleys 79, 80. The pulleys 79, 80 are positioned toward opposite ends of the seat about the slider. One or more wires or cables 81 are attached to the seat and a fixed portion of the vehicle such as the rail. The cables 81 engage the pulleys 80, 79. As the seat is slid by the rider in the forward or aft direction, the pulleys cause the seat to tilt due to changing tension in the cables. The cables are coupled to either end of the rail 85, 86 or some other component of the vehicle and also to the seat at opposite ends 83, 84. In the embodiment as shown, there are two separate cables, one of which runs from rail end 86 across pulley 79 and attaches to the seat at 84. The second cable attaches to the seat at 83 and across pulley 80 and attaches at the rail end 85. If the seat is moved in the aft direction, the edge of the seat in the aft direction will be rotated and lowered. Similarly, if the seat is moved by the rider in the fore direction, the fore-most part of the seat will rotate and will be lowered.

Figure 5C:
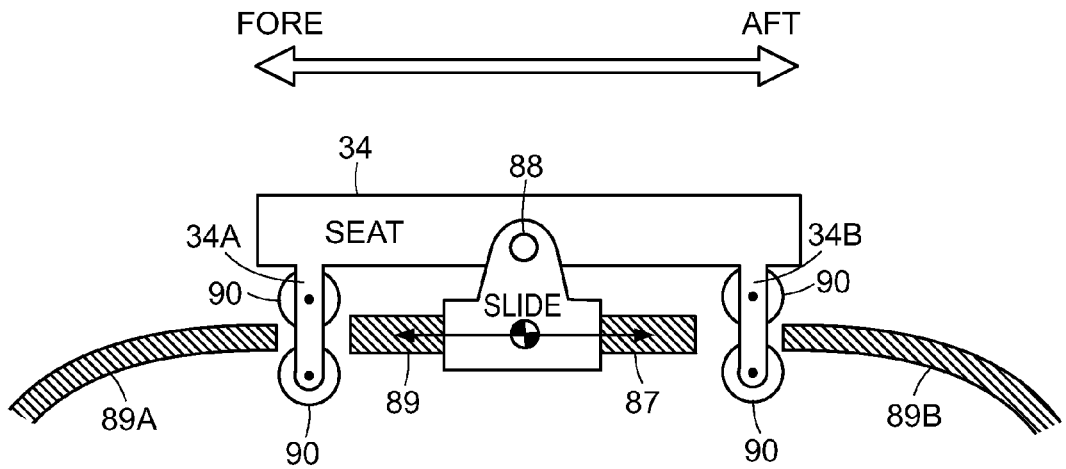
FIG. 5C shows a seat that is coupled to a slider that rides on at least partially curved rails.

In FIG. 5C, the seat is coupled to a slider 87 about a pivot point 88. The slider 87 is seated on a rail 89 and provides for the seat to be slid in a fore and an aft direction. The seat also includes two extensions 34A, 34B that each have two wheels 90 mounted thereto. Between each pair of wheels is a straight track which includes an arc 89A, 89B at each end of the track. As the seat is slid in either the fore or the aft direction the wheels roll along the arc and cause the seat to tilt about the pivot point. It can be imagined that the track has a varying curvature, such that the center portion of the track is itself curved and that the ends have a greater radius of curvature as compared to the center.

Figure 5D:
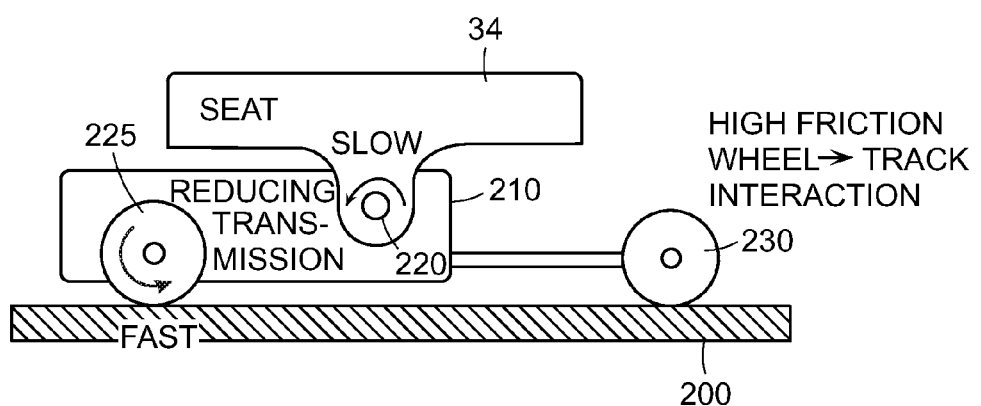
FIG. 5D shows a seat coupled to a track which includes friction wheels wherein the seat both translates and rotates.

In FIG. 5D, the seat 34 rides on a track 200. The seat 34 is coupled to a transmission 210 by a pivot 220. The transmission is coupled to a pair of friction wheels 225, 230. In this embodiment, translation of the seat 34 is directly coupled to rotation of the seat. As the seat is moved by the rider and the friction wheels rotate along the track the seat will also rotate. In the embodiment that is shown, the wheels rotate a greater amount than the pivot rotates the seat. The transmission therefore, causes the seat to pivot/rotate at a fraction of the rotation of the friction wheels. It should be understood that all of the tracks that are shown in FIGS. 5A-5D may be the same length as the platform or may extend beyond the length of the platform in the fore-aft direction or may be shorter than the length of the platform. The support structure also will include a mechanism for holding the track at a proper seat height. For example, the track may be mounted to the control stalk, or may sit on its own mounting structure that is coupled to the platform. For example, the mounting structure may be a shaft.

Figure 6:
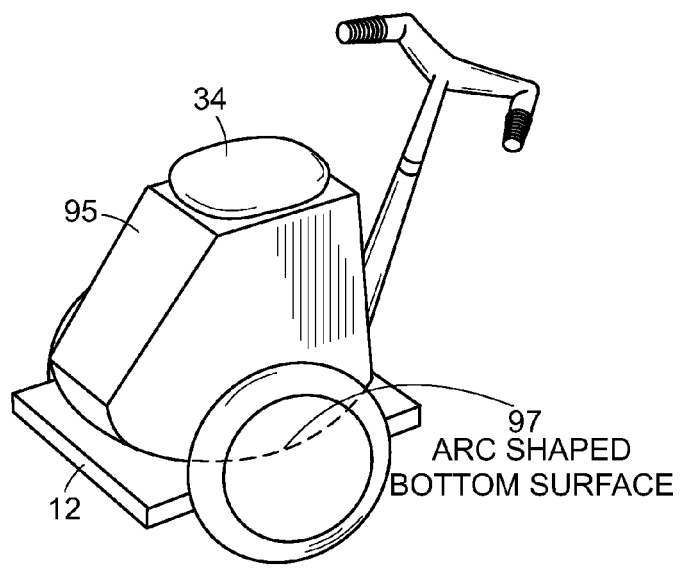
FIG. 6 shows a side view of an embodiment of the dynamically balancing vehicle with a detachable rocker seat.

FIG. 6 shows a side view of an embodiment of the dynamically balancing vehicle with a detachable rocker seat. The rocker seat includes a support structure 95. The bottom portion of the support structure contacts the platform and is shaped like an arc 97 allowing the seat 34 to rock. The arc shaped lower member 97 of the support structure 95 is coupled to the platform 12 via a moving contact point. The arc shaped member 97 member rotates equally in the fore and aft plane in this embodiment. Although in other embodiments, rotation may be limited in either the fore or aft direction. The support structure may also be coupled to the platform via a pair of rails. In this embodiment, the support structure rests on the rails that the rails include a mechanism that constrains the support structure from moving in any other plane other than the fore-aft plane. In such an embodiment, the arch shaped lower portion of the support structure is not coupled to the platform at a contact point. In such an embodiment, the arc shaped member may roll on a series of rails or wheels. In another embodiment, the support structure may include a guide pin that extends through the support structure and is enclosed by the rails on either side of the support structure. In such an embodiment, the seat can rock in the fore-aft direction about a virtual pivot that is above the seat. It should be understood that a virtual pivot point need not be above the seat, in certain embodiments, the virtual pivot point may exist below the seat, for example.

It should be recognized, that the lower surface of the support structure that is formed in an arc may have any number of radii. For example, the lower surface may have a greater curvature at the edges and less of a curvature at its center, so that as the support structure rocks about its central portion, each unit of translation there is proportional to a degree of rotation, but as the support structure is rocked further toward the edges, there is a greater degree of rotation for each unit of translation.

Figure 5E:
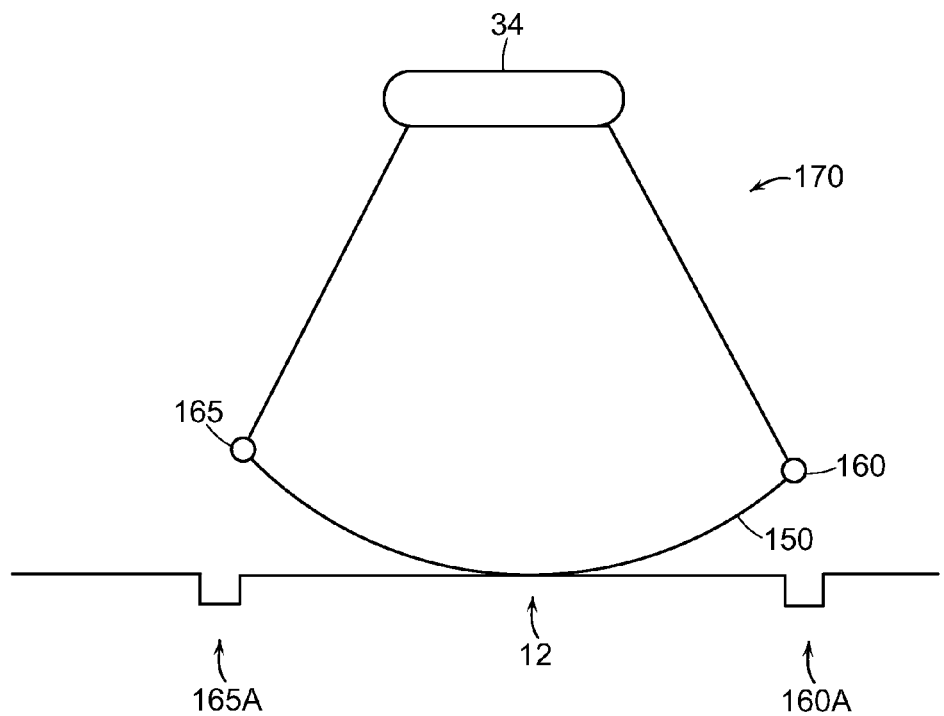
FIG. 5E shows a support structure having a plurality of pins which will engage with recesses in the platform.

In another version, the lower surface of the support structure 150 includes two pins 160, 165 at the edges of the arc as shown in FIG. 5E. As the support structure rocks 170 to the edge, one of the pins 160 or 165 will engage with a recess 160A or 165A in the platform 12. If the rider continues to lean in the same direction, the support structure will rotate about the pin 160 or 165. Thus, there are two different ratios of translation to rotation for this embodiment. As the support structure 170 rocks about the arc there is less rotation for each unit of translation as compared to motion about the pin 160 or 165 in which there is rotation without translation when the pin engages with the recess of the platform.

Figure 6A:
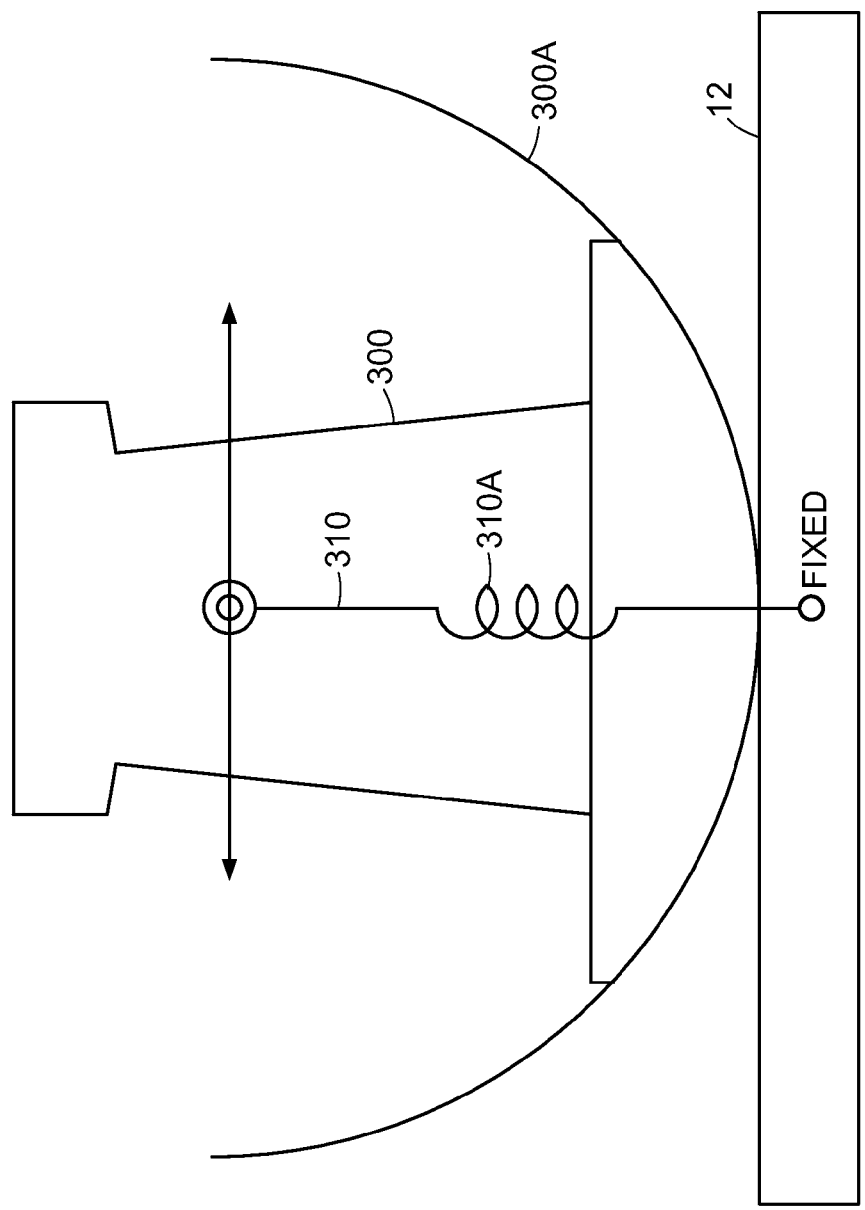
FIG. 6A shows the support structure attached to the platform via a simple cable under tension.
Figure 6B:
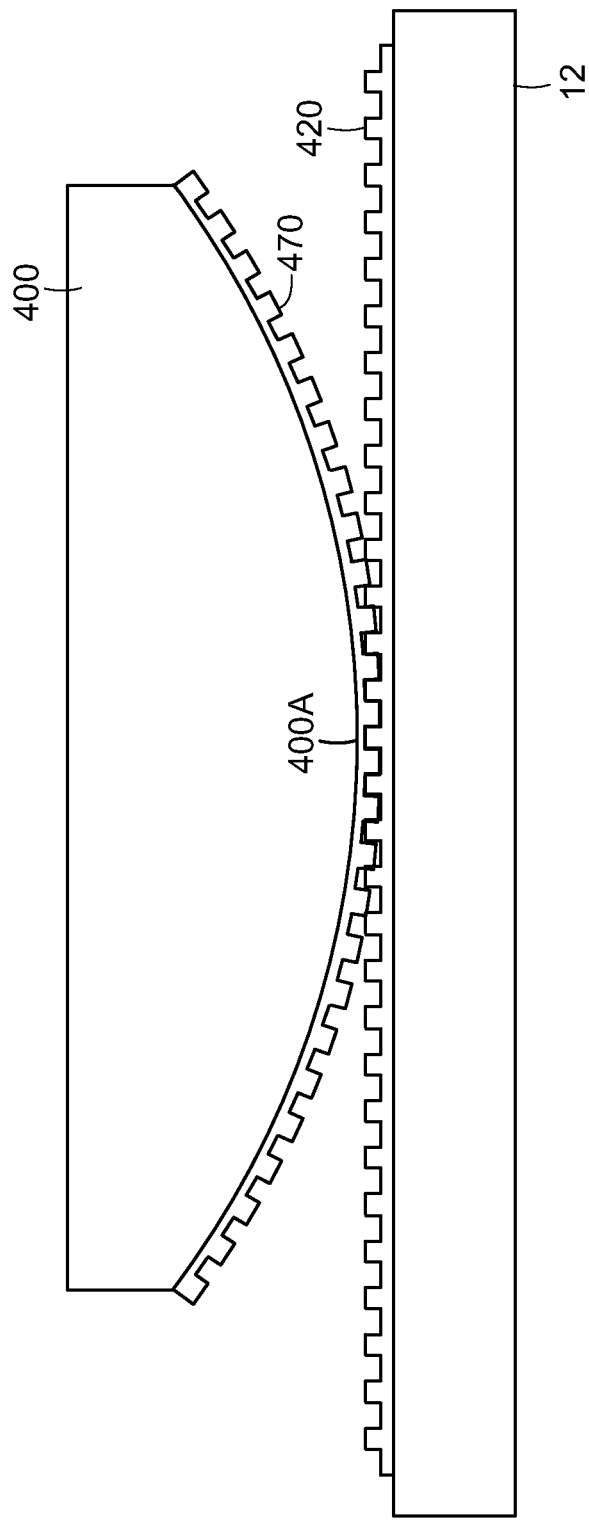
FIG. 6B shows the support structure including a series of teeth on the bottom arced surface and also on the platform.

The embodiment of FIG. 6, in which the support structure has an arc as the lower surface, may be coupled to the platform in any one of a number of ways. For example, gravity may hold the support structure on the platform 12. Further, the platform surface and the bottom surface of the support structure may be formed from materials having a high coefficient of friction. In another embodiment, as shown in FIG. 6A, the support structure 300 may be attached to the platform 12 via a simple cable 310 under tension (including a spring 310A). In this embodiment, as the support structure rocks about the arc of the bottom surface 300A, the spring 310A stretches, and thus there is a restoring force returning the support structure 300 to a centered position as shown. As shown in FIG. 6B, the support structure 400 may include a series of teeth 410 on the bottom arced surface 400A and the platform 12 may include a series of mating teeth 420 for the bottom surface. As the support structure rocks the teeth of the bottom surface and of the platform interlock.

In FIG. 6C, the support structure 500 is coupled to the platform 12 about a pivot point 510. The pivot 510 is coupled to a member 520 which extends down through the platform and which in this embodiment, rides on a pair of wheels 530. In this embodiment, the member 520 is rigid. As force is applied to the support structure 500 by the rider in the fore-aft directions, the support structure 500 will translate and the wheels 530 will rotate on the bottom side of the platform as shown. The support structure 500 will also rotate about the pivot point 510 due to the arched bottom side of the support structure 500A. In this embodiment, the support structure 500 will maintain contact with the platform at all times, including over rough terrain. Again, it should be recognized, that other mechanisms for coupling the support structure to the platform can be envisioned and the present invention should not be limited by the embodiments that are shown.

In one embodiment, the platform of the vehicle includes one or more pressure sensors to sense the rider either engaging or disengaging from the vehicle. When the rider powers-up the vehicle and engages the vehicle, the vehicle enters a balancing mode. A control loop is made operational that senses changes to the position of the center of gravity and that causes the vehicle to move with respect to the changes. If the vehicle includes a seat, the rider may not engage the pressure sensors because her feet may not make contact with the platform or the rider may remove her feet from the platform. In order to overcome this problem, sensors, such as pressure sensors, may be included in the seat. In another embodiment, a mechanical device such as a link or tube may be employed to make contact with the platform when the rider engages the vehicle.

Figure 7A:
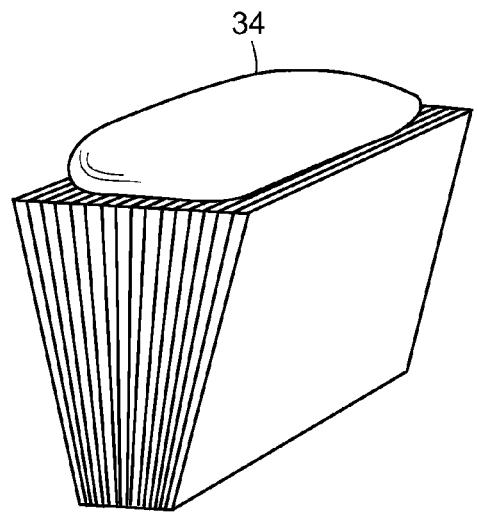
FIG. 7A shows a folding seat which can be attached to a dynamically balancing vehicle wherein the seat is positioned as if a rider is sitting on the seat.
Figure 7C:
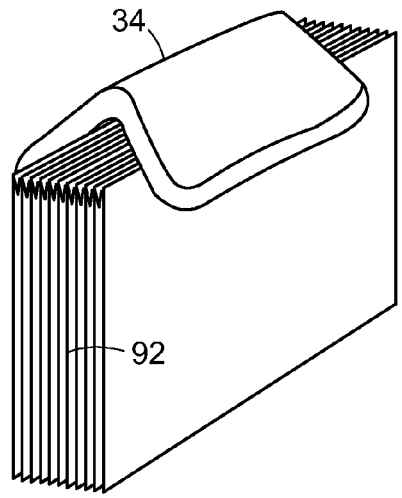
FIG. 7C shows the position of the folding seat when a rider engages/disengages with the vehicle.
Figure 7B:
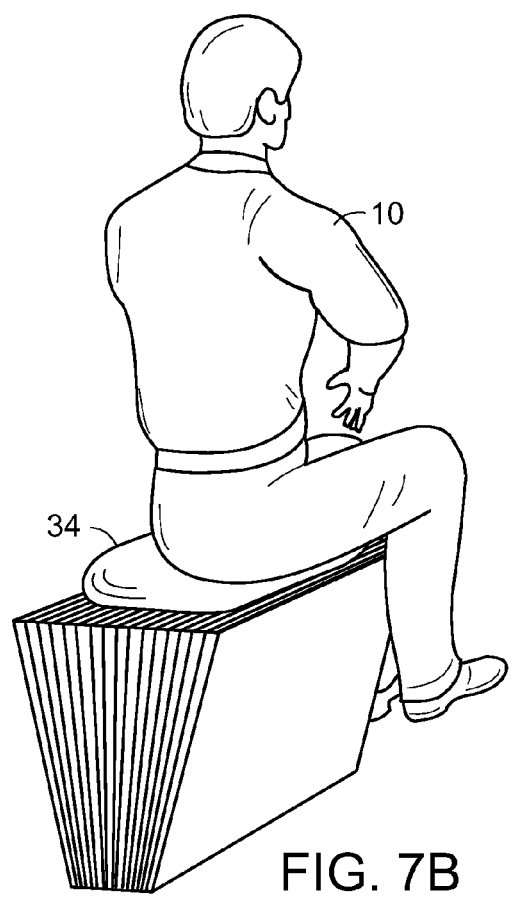
FIG. 7B shows a rider sitting on the folding seat.

The support structure may be designed to either fold or compress in order to allow for the rider to better engage/disengage with the vehicle and also for shock absorption. For example FIGS. 7A-C shows a folding seat which may be employed with the previously described vehicles. In FIG. 7A the seat is in full view and is positioned as if a rider is sitting on the seat. The sides of the seat expand in an outward direction like an accordion when weight is put on the seat. FIG. 7B shows a rider sitting on the seat. FIG. 7C shows the position of the seat when a rider 10 engages/disengages with the vehicle. If the rider is already on the vehicle, the seat 34 rises up and folds as the rider stands and the support structure 92 contracts inwardly reducing the size of the support.

The support structure for the seat may also include a mechanism for allowing lateral movement in a plane substantially perpendicular to the fore-aft plane of the vehicle. The vehicle may include sensors to sense the lateral movement. The sensors can be tied into a control loop so that if a rider leans to the right more power is applied to the left wheel allowing the vehicle to turn to the right. In other embodiments of the support structure, lateral movement may not be tied to sensors and a control loop, but may simply perform the function of allowing the rider to readily shift his or her weight of over rough terrain.

Figure 7D:
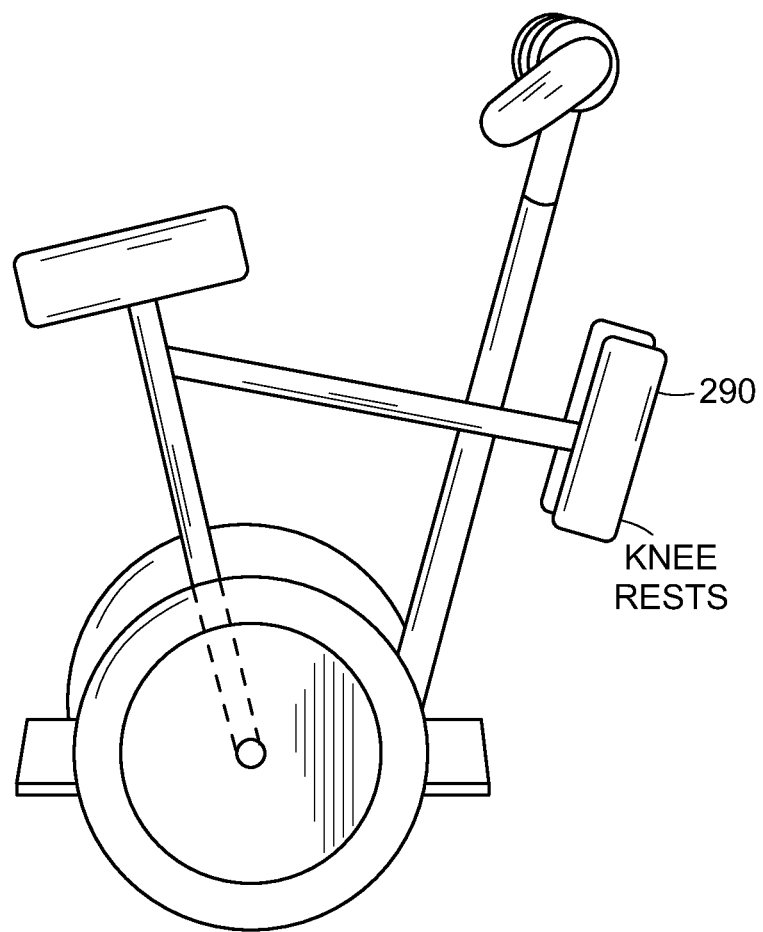
FIG. 7D shows an embodiment of a dynamically balancing vehicle having knee supports.

The support structure may also include knee rests 290 as shown in FIG. 7D to allow more consistent rider coupling to the vehicle and to provide postural advantage and/or partial body support.

FIG. 8 shows another embodiment, in which the seat 34 both translates and rotates. It is preferable that translation and rotation are coupled. In this embodiment, there are force sensors 120 in the seat. As a rider shifts his weight on the seat 34, the force sensors 120 sense the change. Based upon the changes in force, both a linear actuator 125 and a rotational actuator 130 are engaged. If the rider shifts his weight such that more weight is provided to force sensor A than to B, the linear actuator 125 will cause translation of the seat in the fore direction. Additionally, the seat will be rotated in the fore direction by the rotational actuator 130, such that the fore-most part of the seat will be lowered and the aft-most part of the seat will be raised. The embodiment as shown also includes a linear actuator 135 that provides linear motion in the vertical direction. This actuator 135 makes engagement and disengagement with the vehicle easier. In this embodiment, both translation and rotation are controlled by mechanical actuators. Using mechanical actuators for providing translation and rotation of the seat, assists individuals having a reduced strength capacity when compared to the simpler mechanical designs that require the rider to manually shift the position of the seat, to significantly shift their weight using their own strength, and to maintain a position of either leaning in the fore or in the aft direction using their muscle strength.

Figure 9:
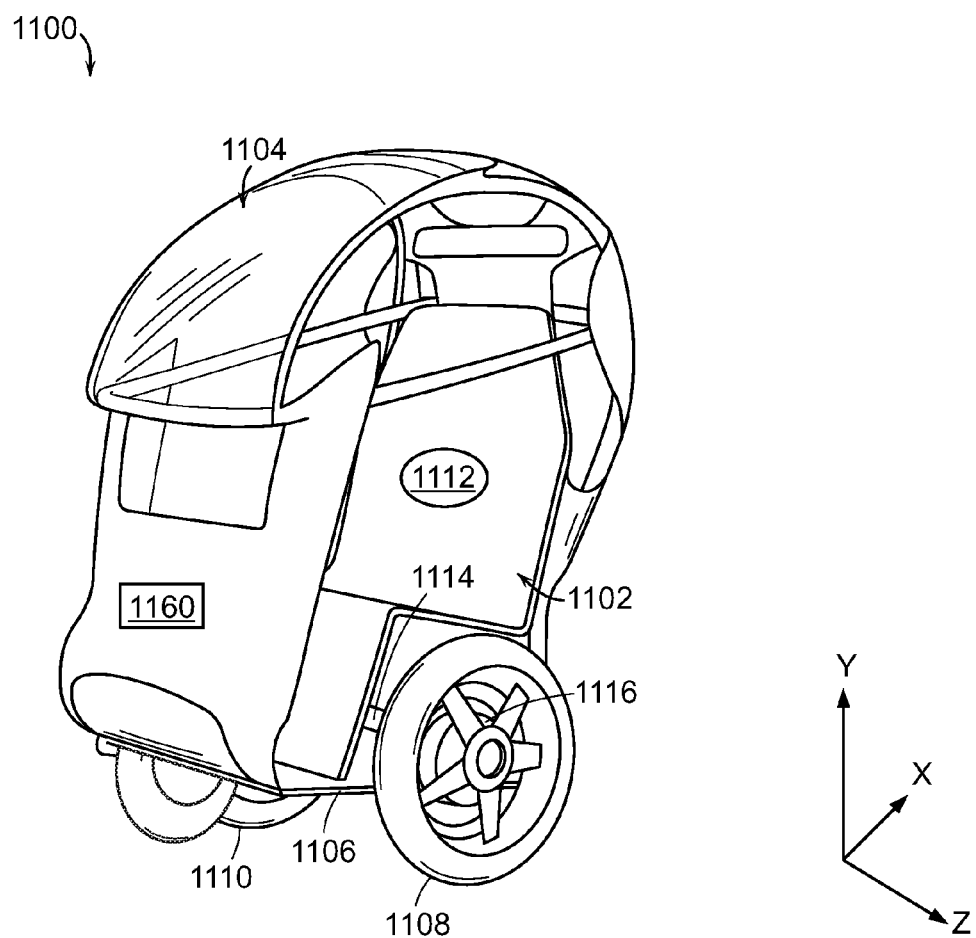
FIG. 9 is a three-dimensional view of a vehicle, according to an illustrative embodiment of the invention.

FIG. 9 is a three-dimensional view of a vehicle 1100, according to an illustrative embodiment of the present invention. A human subject (not shown) rests on a support 1102 in an enclosure 1104 that at least partially encloses the human subject. The vehicle 1100 includes at least two ground-contacting elements 1108, 1110. The two ground-contacting elements 1108, 1110 are coupled to a platform 1106. The ground-contacting element 1108 is laterally disposed to the ground-contacting element 1110. The ground-contacting elements each rotate about an axle 1114 and are powered by at least one drive 1116 (e.g., a motorized drive). A controller (1160) is coupled to the drive 1116 for providing a control signal in response to changes in vehicle orientation (e.g., pitch) and position of the center of gravity 1112 of the vehicle 1100.

The ground-contacting elements 1108 and 1110 are wheels in this embodiment of the invention. As the term is used herein, ground-contacting elements (e.g., ground-contacting elements 1108 and 1110) can be wheels or any other structure that supports the vehicle with respect to an underlying surface and controls the locomotion and/or balancing of the vehicle. In some embodiments, one or more ground-contacting elements of a vehicle are a track, roller, ball, arcuate element or leg.

As the human subject mounts the vehicle 1100, the controller 1160 implements a control loop and senses a change in the vehicle's 1100 orientation that can result from a change in the position of the center of gravity 1112 in a fore-aft plane and controls power provided to the ground-contacting elements 1108, 1110 based upon the change to the position of the center of gravity 1112. In response to the change in the vehicle's 1110 orientation and changes in the position of the center of gravity 1112, torque is applied to the ground-contacting elements 1108, 1110 to dynamically stabilize the vehicle 1100.

In one embodiment, as the position of the center of gravity 1112 moves in a fore direction (toward the negative X-Axis direction), the drive 1116 provides power to the two ground-contacting elements 1108, 1110 sufficient to cause the vehicle 1100 to move forward (toward the negative X-Axis direction). As the center of gravity 1112 moves in the aft direction (toward the positive X-Axis direction), the drive 1116 provides power to the two ground-contacting elements 1108, 1110 sufficient to cause the vehicle 1100 to slow and reverse direction such that the vehicle 1100 moves backward (toward the positive X-Axis direction). In some embodiments, as the position of the center of gravity 1112 moves laterally, (along the positive or negative Z-axis), the drive component 1116 provides power to the two ground-contacting elements 1108, 1110 sufficient to cause the vehicle 1100 to turn left or right. More power can be applied to the left ground-contacting element to turn right. In some embodiments, less power is provided to the right ground-contacting element to turn right. In some embodiments, more power is provided to the left ground-contacting element and less power is provided to the right ground-contacting element to turn right.

The pitch of the vehicle 1100 (angular orientation of the vehicle 1100 about the axle 1114 of the vehicle 1100) may also be sensed and compensated for in the control loop. The controller includes gyroscopes for sensing orientation of the vehicle 1100 that can result from changes in the position of the center of gravity 1112. Appropriate force transducers may be provided to sense leftward and rightward leaning and related controls provided to cause left and right turning as a result of the sensed leaning. The leaning may also be detected using proximity sensors. Similarly, the vehicle of this embodiment may be equipped with a foot- (or force-) actuated switch located on, for example, the platform 1106 or support 1102 to activate the vehicle 1100, in such a manner that the switch is closed so as to power the vehicle 1100 automatically when the subject contacts the platform 1106.

In another embodiment, as the center of gravity 1112 moves in the fore direction (toward the negative X-Axis direction), the drive 1116 provides power to the two ground-contacting elements 1108, 1110 sufficient to cause the vehicle 1100 to move backward (toward the positive X-Axis direction). As the center of gravity 1112 moves in the aft direction (toward the positive X-Axis direction), the drive 1116 provides power to the two ground-contacting elements 1108, 1110 sufficient to cause the vehicle 1100 to slow down and reverse direction such that the vehicle 1100 moves forward (toward the negative X-Axis direction).

Vehicle 1100 pitch variation is decreased during operation when the vehicle 1100 is dynamically stabilized based on the change in the position of the center of gravity 1112 rather than in response to a change in pitch. It also shortens the time it takes the vehicle 1100 to respond to an acceleration and/or deceleration command. The vehicle 1100 accelerates and/or decelerates by restoring the position of the center of gravity 1112 of the vehicle 1100 over the location that the ground-contacting elements 1108 and 1110 contact the ground. If the vehicle 1100 was accelerated and/or decelerated in response to a change in pitch, a controller of the vehicle 1100 would first need to induce a change in the position of the center of gravity 1112 relative to a steady state position and then command the drive 1116 to operate the ground-contacting elements 1108 and 1110 in such a manner as to position the center of gravity 1112 above the location where the ground-contacting elements contact the ground. The time required to induce a change in the position of the center of gravity 1112 back to the steady state position is a time delay for the vehicle 1100 to respond to an acceleration and/or deceleration command compared to acceleration and/or deceleration in response to a change in the position of the center of gravity. The vehicle 1100 does not need to induce the change in the position of the center of gravity 1112 from a steady state because the change of the position of the center of gravity 1112 is inherit in the acceleration and/or deceleration command. The acceleration and/or deceleration command necessitates a change in the orientation of the vehicle 1100 to position the center of gravity 1112 in the correct position so that acceleration and/or deceleration can begin.

Figure 10:
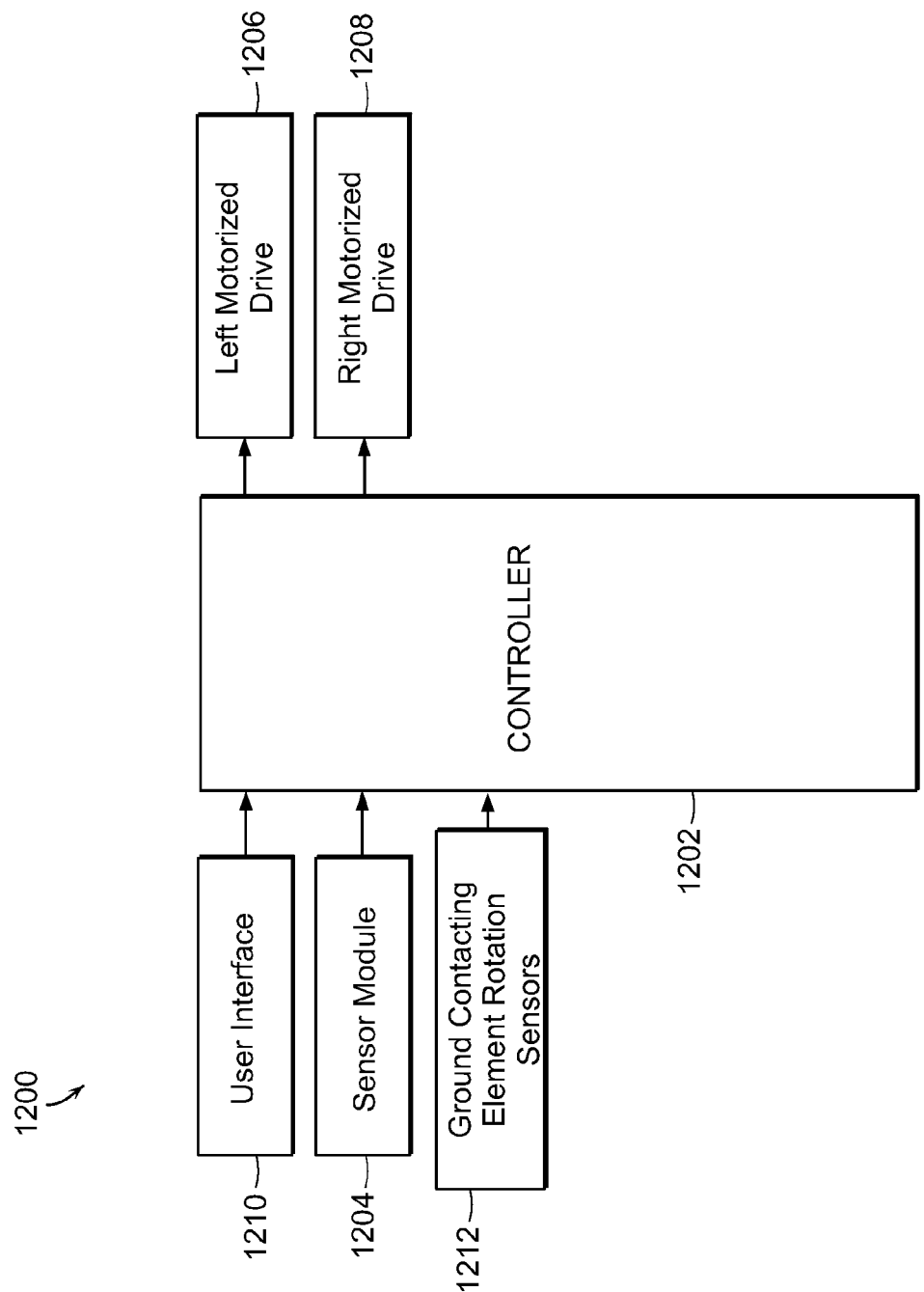
FIG. 10 is a block diagram of a control system for dynamically controlling the stability of a vehicle, according to an illustrative embodiment of the invention.

FIG. 10 is a block diagram of a control system 1200 for dynamically controlling the stability of a vehicle (e.g., vehicle 1100 as discussed above in FIG. 9), according to an illustrative embodiment of the invention. A controller 1202 receives an input characteristic of a position of a center of gravity of a vehicle (e.g., center of gravity 1112 as discussed above in FIG. 9) from a sensor module 1204. Based on at least the position of the center of gravity provided by the sensor module 1204, the controller 1202 commands torque T of at least one of the left motorized drive 1206 or right motorized drive 1208 (e.g., torque applied to the corresponding ground contact elements).

Figure 10B:
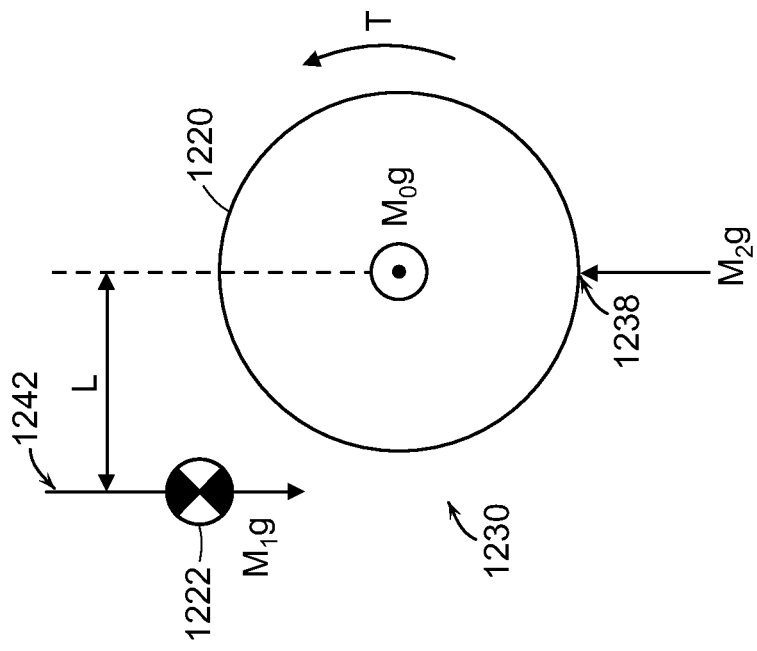
FIG. 10B is a block diagram of an alternative position of the center of gravity of the vehicle of FIG. 10A with respect to a ground-contacting element of the vehicle.
Figure 10A:
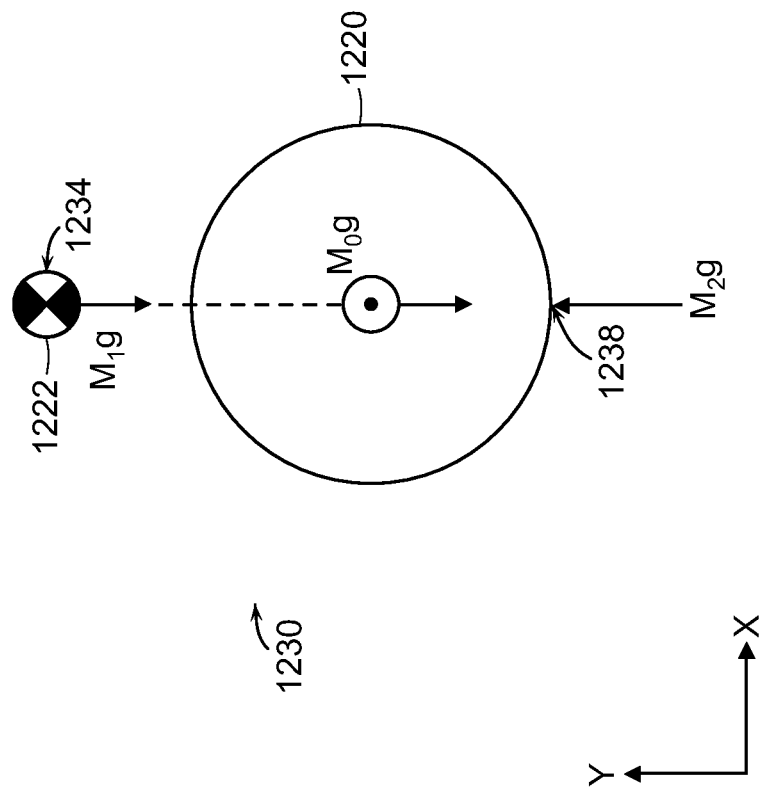
FIG. 10A is a block diagram of position of the center of gravity of a vehicle with respect to a ground-contacting element of the vehicle.

FIGS. 10A and 10B are block diagrams that illustrate the effect of the position of the center of gravity 1222 of a vehicle 1230 on operation of the vehicle 1230, according to an illustrative embodiment of the invention. The vehicle 1230 has a total mass $M_2$ (weight of $M_2g$). The mass of a payload and a portion of the vehicle 1230 is denoted as $M_1$ (weight of $M_1g$) which corresponds to the mass of the center of gravity 1222. The mass of two laterally disposed contacting elements 1220 is denoted as mass $M_0$ (weight of $M_0g$). The weight of the vehicle 1230 is expressed as:

$$M_2g = M_1g + M_0g \qquad \text{EQN. 1}$$

The portion of the vehicle 1230 capable of moving along the X-Axis direction relative to the position of the ground-contacting elements 1220 is represented by the center of gravity 1222. Referring to FIG. 10A, the center of gravity 1222 is located at an initial location 1234 above the location 1238 where the ground-contacting elements 1220 contact the ground.

Referring to FIG. 10B, the center of gravity 1222 is located at a location 1242, at a distance L along the negative X-Axis direction relative to the initial location 1234. In one embodiment, the center of gravity 1222 is positioned at location 1242 by a human subject moving the position of the center of gravity of the vehicle 1230 (e.g., similarly as described herein with respect to, for example, FIG. 9). The sensor module 1204 (of FIG. 10) provides the pitch of the vehicle 1230 and the orientation of the vehicle 1230, that change as the position 1242 of the center of gravity 1222 changes, to the controller 1202. The controller 1202 outputs a signal to the left motorized drive 1206 and right motorized drive 1208 to apply a torque $[T=(M_1g)(L)]$ to the ground-contacting elements 1220 to cause the ground-contacting elements 1220 to move in the direction (e.g., forward along the negative X-Axis direction) the center of gravity 1222 has been displaced from the previous location 1238 to maintain balance of the vehicle 1230.

The masses of the vehicle 1230 can be advantageously distributed between the payload and related structure (collectively 1222) and the ground contacting-elements and related structure (collectively 1220) to maximize acceleration and deceleration performance. In one embodiment, it is advantageous to locate a larger percentage of the total vehicle 1230 mass with the moving portion of the vehicle 1230 (i.e., with the payload and related structure 1222) to maximize acceleration and deceleration performance. Placing more of the total vehicle 1230 mass with the moving portion 1222 enables the larger amount of mass to contribute to generating the motor commands required to accelerate or decelerate the vehicle 1230. If, however, more of the total vehicle 1230 mass was placed with the ground-contacting elements and related structure 1220, the larger percentage of mass would be a load that the vehicle 1230 needs to move as part of the entire vehicle 1230.

The controller 1202 also interfaces with a user interface 1210 and a wheel rotation sensor 1212. The user interface 1210 can, for example, include controls for turning the vehicle on or off, or for triggering different operating modes of the vehicle (e.g., the operating modes described with respect to FIGS. 13A and 13B).

The sensor module 1204 detects one or more vehicle parameters to determine a change in the position of the center of gravity of the vehicle. In one embodiment, the sensor module 1204 generates a signal indicative of a change in the position of the center of gravity at one instance in time with respect to the position of the center of gravity at another instance in time. For example, a distance sensor attached to a spring, a load sensor, an inclinometer, a gyroscope, whiskers and/or an angular rate sensor can be used to determine a change in the center of gravity of the vehicle. Other sensors (e.g., optical sensors and/or magnetic sensors) can also be employed and are therefore within the scope of the present invention.

The controller 1202 includes a control algorithm to determine the amount of torque to be applied by the left motorized drive 1206 and/or right motorized drive 1210 based on the position of the center of gravity. The control algorithm can be configured, for example, during the design of the vehicle or in real time, on the basis of a current operating mode of the vehicle, operating conditions experience by the vehicle, as well as preferences of a human subject. The controller 1202 can implement the control algorithm for example, by using a control loop. The operation of control loops is well known in the art of electromechanical engineering and is outlined, for example, in Fraser & Milne, Electro-Mechanical Engineering, IEEE Press (1994), particularly in Chapter 11, "Principles of Continuous Control" which is incorporated herein by reference.

As an example, not meant to be limiting, the control algorithm can take the form:

$$\text{Torque Command} = K \cdot (C + O) \quad \text{(EQN. 2)}$$

where K is the gain, C is a vector defining the position of the center of gravity of the vehicle, and O is an offset. The position of the center of gravity, C, can be in the form of an error term defined as the desired position of the center of gravity minus the sensed position of the center of gravity. The desired position of the center of gravity can be for example, a predetermined constant in the control algorithm. Alternatively, a human subject in the vehicle can set the position of the center of gravity via a user interface. In this embodiment, upon starting the vehicle and prior to allowing movement of the vehicle, a human subject can activate a switch on the vehicle that triggers determination of the desired position of the center of gravity based on inputs received from the sensor module. This allows the human subject to acquire a known initial position of the center of gravity, from which the human subject can then deviate so as to cause a change in the position of the center of gravity.

The gain, K, can be a predetermined constant, or can be entered or adjusted by the human subject through the user interface 1210. Gain K is, most generally, a vector, with the torque determined as a scalar product of the gain and the position of the center of gravity displacement vector. Responsiveness of the vehicle to changes in the position of the center of gravity can be governed by K. For example, increasing the magnitude of at least one element of vector K causes a human subject to perceive a stiffer response in that a small change in the position of the center of gravity results in a large torque command.

Offset, O, can be incorporated into the control algorithm to govern the torque applied to the left motorized drive 1206 and right motorized drives 1208, either in addition to, or separate from, the direct effect of C. Thus, for example, the human subject can provide an input by means of the user interface 1210, the input is treated by the controller 1202 equivalently to a change, for example, in the position of the center of gravity.

In one embodiment, steering can be accomplished by calculating the torque desired for the left motorized drive 1206 and the torque desired for the right motorized drive 1208 separately. Additionally, tracking both left wheel motion and the right wheel motion permits adjustments to be made, as known to persons of ordinary skill in the control arts, to prevent unwanted turning of the vehicle and to account for performance variations between the left motorized drive 1206 and the right motorized drive 1208.

In some embodiments, a change in the position of the center of gravity is sensed in the fore-aft plane and/or the lateral plane. Sensing a change in the position of the center of gravity in the lateral plane ensures stability with respect to tipping in the lateral plane. In such embodiments, lateral changes in the position of the center of gravity are used to trigger anti-tipping mechanisms or otherwise modify the operation of the vehicles performance (e.g., altering the torque applied to one or more ground-contacting elements). In some embodiments, lateral changes in the position of the center of gravity are used to command the vehicle to turn left or right.

Steering may be accomplished in an embodiment having at least two laterally disposed ground-contacting elements (e.g., a left and right wheel), by providing, for example, separate motors for left and right ground-contacting elements. Torque desired for the left motor and the torque desired from the right motor can be calculated separately. Additionally, tracking both the left ground-contacting element motion and the right ground-contacting element motion with the ground-contacting element rotation sensors 1212 permits adjustments to be made, as known to persons of ordinary skill in the control arts, to prevent unwanted turning of the vehicle and to account for performance variations between the two motors. In some embodiments, steering sensitivity is adjusted to a higher sensitivity when a vehicle is at lower speeds and lower sensitivity when a vehicle is at higher speeds to allow, for example, easier steering at higher speeds.

In some embodiments, the control system 1200 limits the speed of a vehicle (e.g., vehicle 100 as discussed above in FIG. 9). The speed limit can be set based on, for example, a maximum speed associated with the operating mode of the vehicle (for example, as discussed below in connection with FIG. 13A and FIG. 13B) or an input from the human subject.

In one embodiment, the control system 1200 includes a speed limiting algorithm that regulates the speed of the vehicle by controlling the pitch of the vehicle. The controller 1202 changes the pitch of the vehicle which moves the position of the center of gravity. Changes in the position of the center of gravity causes the vehicle to accelerate or decelerate depending on which direction the center of gravity is moved. The speed limiting algorithm causes the controller 1202 to accelerate or decelerate the vehicle by adjusting a desired pitch angle $\Theta_D$. The pitch control loop of the system 1200 controls the system 1200 to achieve the desired pitch angle $\Theta_D$.

The adjustment of the desired pitch angle $\theta_D$ is determined based on the following relationship:

$$\Theta_D = K1 * \left[ \frac{A}{K2*(V_{SpeedLimit} - V_{cm}) +} \right.$$
$$\left. \frac{B}{K3*(IntegratedSpeedError)} + \frac{C}{K4*(\text{Acceleration})} \right] \quad \text{(EQN. 3)}$$

where $V_{SpeedLimit}$ is the current maximum speed of the vehicle, $V_{cm}$ is the speed of the vehicle, K2 is a gain proportional to the difference between the vehicle's speed limit and the vehicle's actual speed, K3 is a gain on the Integrated Speed Error, which is the integrated difference between the vehicle's speed limit and the vehicle's actual speed, K4 is a gain on the acceleration of the vehicle, K1 is a gain on the overall calculated desired pitch that can be a function of, for example, a position of the center of gravity of the vehicle, and $\theta_D$ is the desired pitch angle. The cumulative effect of terms A, B and C in EQN. 3 is to cause the vehicle to pitch backward into a deceleration orientation if the speed limit is exceeded. The value of the desired pitch angle, $\theta_D$ is varied in the control system 1200 to control the speed of the vehicle.

In one embodiment, the desired pitch angle $\theta_D$ remains constant (e.g., the vehicle remains level with respect to the ground plane). When a predefined maximum speed limit is reached, the control system 1200 responds by setting the desired pitch angle $\theta_D$ to a value to decelerate the vehicle to prevent the vehicle from exceeding the maximum speed limit. This has the effect of the control system 1200 commanding the vehicle to pitch backwards which causes the speed of the vehicle to decrease.

In some embodiments, the control system 1200 is configured to account for the human subject commanding the vehicle to slow down. When the control system 1200 determines that the human subject has caused the position of the center of gravity to shift rearward, the controller reduces the value of the gain K1. By reducing the value of the gain K1, the pitch angle terms in the control system 1200 (governed by, for example, EQN. 3) are de-emphasized. Because the control system 1200 de-emphasizes the pitch angle terms, the control system 1200 does not command the vehicle to pitch backwards as much as it would in the absence of the human subject commanding the vehicle to slow down. In some embodiments, the human subject and support return to a more level orientation with respect to the ground as the vehicle speed decreases.

Figure 11A:
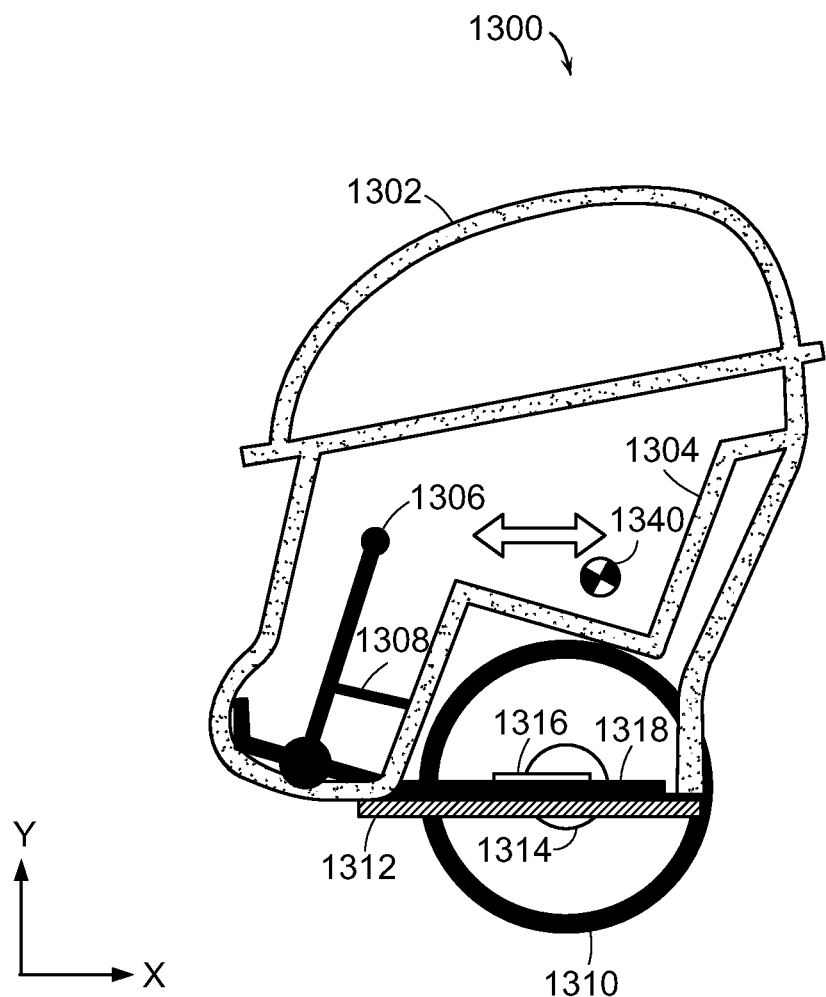
FIG. 11A is a schematic illustration of a vehicle, according to an illustrative embodiment of the invention.

FIG. 11A is a schematic illustration of a vehicle 1300, according to an illustrative embodiment of the invention. The vehicle 1300 includes an enclosure 1302 coupled to a support 1304. The vehicle 1300 also includes at least one ground-contacting element 1310 coupled to a platform 1312. The ground-contacting element 1310 rotates about an axle 1314 which is coupled to the platform 1312. In some embodiments, the ground-contacting element 1310 is a wheel. In some embodiments, the vehicle 1300 includes two or more laterally disposed ground-contacting elements 1310 which assist with providing lateral stability to the vehicle 1300. In some embodiments, the ground-contacting element 1310 is a cluster of wheels or arcuate elements that are disposed around the axle 1314. The cluster of wheels or arcuate elements rotate around the axle 1314 when providing lateral stability to the vehicle 1300.

A structure (combination of rail 1316 and rail guide 1318) couples the enclosure 1302 and support 1304 to the platform 1312 and ground-contacting element 1310. The enclosure 1302 and support 1304 are coupled to the rail 1316. The enclosure 1302, support 1304 and rail 1316 slide relative to the rail guide 1318 that is coupled to the platform 1312 of the ground-contacting element 1310. In this embodiment, a human subject (not shown) manipulates an input device 1306 to cause a position of a center of gravity 1340 of the vehicle 1300 to change. The input device 1306 is coupled to a linkage 1308. The linkage 1308 is coupled to the support 1304. The input device 1306 can be, for example, a control stick, yoke, steering wheel or handlebar.

The human subject pushes the input device 1306 forward (toward the negative X-Axis direction) which moves the enclosure 1302 and support 1304 forward (toward the negative X-Axis direction) relative to the ground-contacting element 1310. The position of the center of gravity 1340 of the vehicle 1300 moves forward in response to the enclosure 1302 and support 1304 moving forward. A forward torque is generated by the ground-contacting element 1310 in response to the center of gravity 1340 of the vehicle 1300 moving forward. The human subject pulls the input device 1306 backward (toward the human subject's body and along the positive X-Axis direction) which moves the enclosure 1302 and support 1304 backward (toward the positive X-Axis direction) relative to the ground-contacting element 1310. The position of the center of gravity 1340 of the vehicle 1300 moves backward in response to the enclosure 1302 and support 1304 moving backward. A negative torque is generated by the ground-contacting element 1310 in response to the position of the center of gravity 1340 of the vehicle 1300 moving backward. In one embodiment, the vehicle 1300 does not have a platform 1312 and the rail guide 1316 is coupled to a structure attached to the at least one ground-contacting element 1310 (e.g., a cross bar coupling two laterally disposed ground-contacting elements.

In some embodiments, when the enclosure 1302, support 1304 and rail 1316 slide forward or backward relative to the rail guide 1318, platform 1312 and ground-contacting element 1310, the enclosure 1302, support 1304 and rail 1316 remain level (or substantially level) relative to the ground. In alternative embodiments, when the enclosure 1302, support 1304 and rail 1316 slide forward or backward relative to the rail guide 1318, platform 1312 and ground-contacting element 1310, the enclosure 1302, support 1304 and rail 1316 pitch relative to the ground. The vehicle 1300 can be adapted such that enclosure 1302, support 1304 and rail 1316 pitch forward when the enclosure 1302, support 1304 and rail 1316 slide forward, or alternatively, adapted such that enclosure 1302, support 1304 and rail 1316 pitch backward when the enclosure 1302, support 1304 and rail 1316 slide forward.

In some embodiments, the human subject shifts his/her weight forward or backward to move the position of the center of gravity to cause the vehicle to move forward or backward, respectively, without causing the enclosure 1302, support 1304 and rail 1316 to move relative to the rail guide 1318, platform 1312 and the ground-contacting elements 1310.

In some embodiments, the linkage 1308 is coupled to a device that provides stiffness or damping to movement of the linkage 1308 to, for example, enforce particular types of inputs to the vehicle and/or enhance the human subject's experience. In some embodiments, the device limits the speed that the linkage 1308 is permitted to move which limits the speed at which the position of the center of gravity 1340 is permitted to change and, therefore, limits the rate of change of the speed of the vehicle 1300.

In some embodiments, the device damps oscillations in the movement of the linkage 1308 to reduce oscillations in the pitch control loop and/or center of gravity control loop of a controller that controls operation of the vehicle 1300. In the absence of the device, oscillations induced in the linkage 1308 by, for example, a human subject pushing or pulling the input device 1306 would result in oscillations in the pitch and/or speed of the vehicle 1300.

In some embodiments, the rail 1316 and/or rail guide 1318 includes a damper to prevent the speed of the vehicle 1300 from oscillating when the rail 1316 moves out of phase with respect to the rail guide 1318 due to, for example, an external disturbance or on-vehicle disturbance. For example, when the vehicle 1300 travels over a bump, the rail 1316 may move relative to the rail guide 1318, thereby moving the position of the center of gravity 1340 of the vehicle 1300. Movement of the position of the center of gravity 1340 causes the vehicle 1300 to accelerate or decelerate. Therefore, a damper coupling the rail 1316 to the rail guide 1318 would reduce the high frequency motion otherwise induced by the bump, and reduce the variation in the speed of the vehicle 1300 due to the bump. The damper would not damp lower frequency motions introduced, for example, by a human subject pushing the input device 1306 to command a change to the position of the center of gravity 1340 of the vehicle. In some embodiments, the damper is configured to damp high frequency oscillations or impulses. The damper can be a mechanical damper coupling the rail 1316 to the rail guide 1318. In some embodiments, the damper is a damping term implemented in a controller (e.g., controller 1202 as discussed above).

In some embodiments, the vehicle 1300 includes an additional mechanism that allows for changing the position of the center of gravity 1340 in planes other than the fore-aft plane. In one embodiment, the vehicle 1300 includes a second rail/rail guide pair that allows for changing the position of the center of gravity 1340 in the lateral direction (i.e., along the Z-Axis direction).

In an alternative embodiment, the vehicle 1300 includes a foot member coupled to the platform 1312. When the human subject pushes against the foot member, the support 1304 and enclosure 1302 move backward (along the positive X-Axis direction) relative to the ground-contacting element 1310. The center of gravity 1340 of the vehicle 1300 moves backward in response to the enclosure 1302 and support 1304 moving backward. A negative torque is generated by the ground-contacting element 1310 in response to the center of gravity 1340 of the vehicle 1300 moving backward.

Figure 11B:
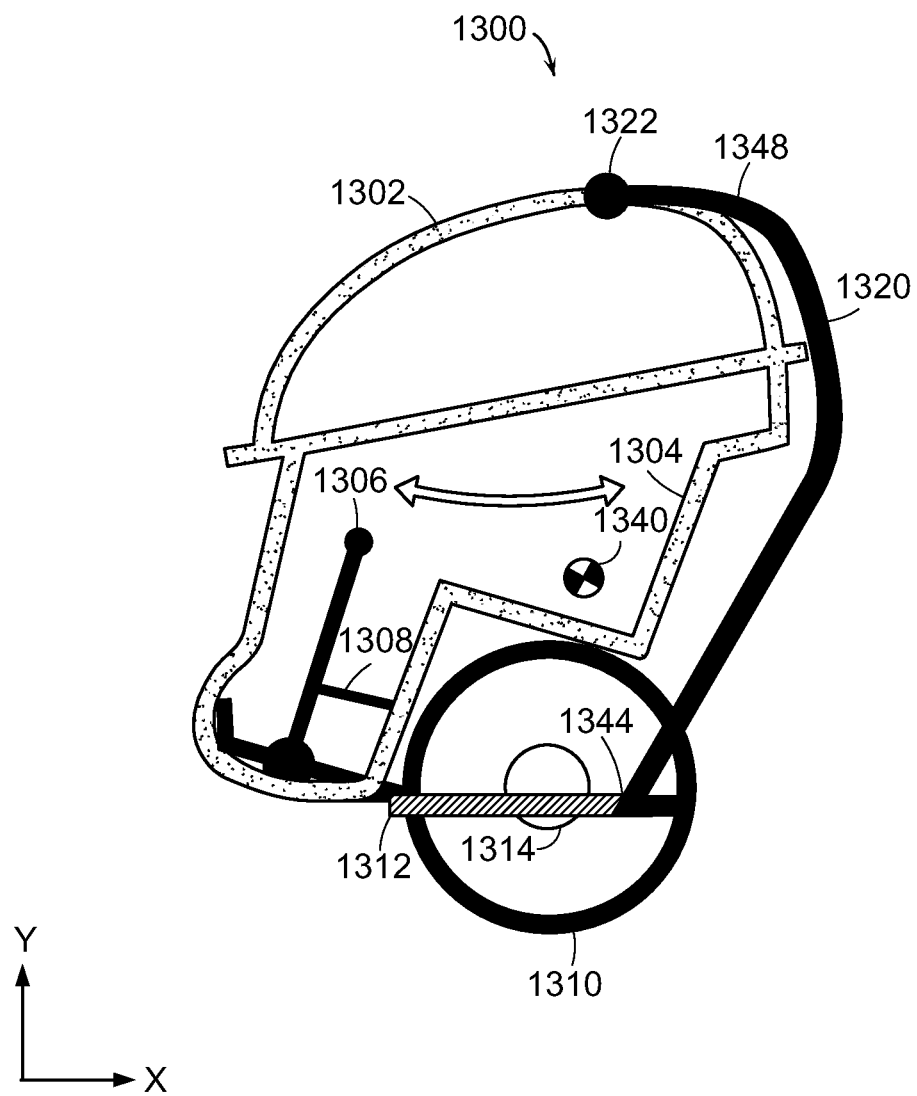
FIG. 11B is a schematic illustration of a vehicle, according to an illustrative embodiment of the invention.

FIG. 11B is a schematic illustration of the vehicle 1300, according to an illustrative embodiment of the invention. The enclosure 1302 is coupled to the support 1304. The at least one ground-contacting element 1310 is coupled to the platform 1312. The ground-contacting element 1310 rotates about the axle 1314. In this embodiment, a structure (the pivot member 1320) couples the support 1302 and enclosure 1304 to the platform 1312 and ground-contacting element 1310. The enclosure 1302 and support 1304 are coupled to a pivot member 1320 with a pivot mechanism 1322 located at a first end 1348 of the pivot member 1320. The pivot member 1320 is coupled to the platform 1312 at a second end 1344 of the pivot member 1320. The enclosure 1302 and support 1304 pivot about the pivot mechanism 1322.

In this embodiment, a human subject (not shown) sits on the support 1304 and manipulates an input device 1306 to cause a position of a center of gravity 1340 of the vehicle 1300 to change. The input device 1306 is coupled to the linkage 1308. The linkage 1308 is coupled to the support 1304. The human subject pushes the input device 1306 forward (toward the negative X-Axis direction) which causes the enclosure 1302 and support 1304 to pivot about the pivot mechanism 1322 (around the Z-Axis), moving the enclosure 1302 and support 1304 forward (toward the negative X-Axis direction) relative to the ground-contacting element 1310. The position of the center of gravity 1340 of the vehicle 1300 moves forward in response to the enclosure 1302 and support 1304 moving forward. A forward torque is generated by the ground-contacting element 1310 in response to the position of the center of gravity 1340 of the vehicle 1300 moving forward.

The human subject pulls the input device 1306 backward (toward the human subject's body and along the positive X-Axis direction) which causes the enclosure 1302 and support 1304 to pivot about the pivot mechanism 1322, moving the enclosure 1302 and support 1304 backward (toward the positive X-Axis direction) relative to the ground-contacting element 1310. The position of the center of gravity 1340 of the vehicle 1300 moves backward in response to the enclosure 1302 and support 1304 moving backward. A negative torque is generated by the ground-contacting element 1310 in response to the position of the center of gravity of the vehicle 1300 moving backward.

In some embodiments, the pivot mechanism 1322 permits motion of the enclosure 1302 and support 1304 in two or more degrees of freedom. The enclosure 1302 and support 1304 also pivot about the X-Axis. The enclosure 1302 and support 1304 rotate about both the Z-Axis (change in pitch) and the X-Axis (change in roll angle). In some embodiments, the change in roll angle causes the vehicle 1300 to turn left or right. In some embodiments, the position of the center of gravity 1340 moves in three degrees of freedom (i.e., along the X-Axis, Y-Axis and Z-Axis).

Figure 11C:
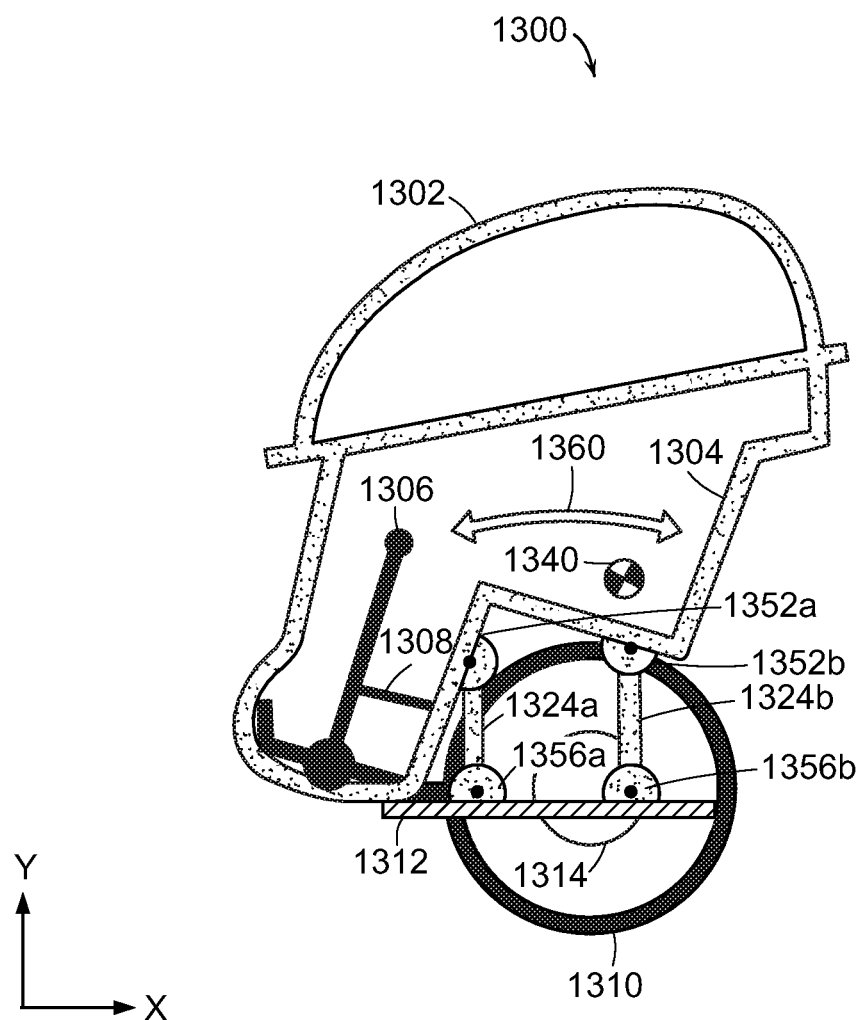
FIG. 11C is a schematic illustration of a vehicle, according to an illustrative embodiment of the invention.

FIG. 11C is a schematic illustration of the vehicle 1300, according to an illustrative embodiment of the invention. The enclosure 1302 is coupled to the support 1304. The at least one ground-contacting element 1310 is coupled to the platform 1312. The ground-contacting element 1310 rotates about the axle 1314. The enclosure 1302 and support 1304 are coupled to at least one four-bar linkage 1324 (first bar 1324*a* and second bar 1324*b*). A first end 1352*a* of the first bar 1324*a* is coupled to the support 1304. A second end 1356*a* of the first bar 1324*a* is coupled to the platform 1312. A first end 1352*b* of the second bar 1324*b* is coupled to the support 1304. A second end 1356*b* of the second bar 1324*b* is coupled to the platform 1312.

The enclosure 1302 and support 1304 move along a path 1360 defined by a rotation of the four-bar linkage 1324 about the axle 1314 of the ground-contacting element 1310 in the X-Y plane. In this embodiment, a human subject (not shown) manipulates an input device 1306 to cause the position of the center of gravity 1340 of the vehicle 1300 to change. The input device 1306 is coupled to the linkage 1308. The linkage 1308 is coupled to the support 1304. The human subject pushes the input device 1306 forward (toward the negative X-Axis direction) which moves the enclosure 1302 and support 1304 along the path 1360 defined by the rotation of the four-bar linkage 1324, moving the enclosure 1302 and support 1304 forward (toward the negative X-Axis direction) relative to the ground-contacting element 1310. The position of the center of gravity 1340 of the vehicle 1300 moves forward in response to the enclosure 1302 and support 1304 moving forward. A forward torque is generated by the ground-contacting element 1310 in response to the position of the center of gravity 1340 of the vehicle 1300 moving forward.

The human subject pulls the input device 1306 backward (toward the human subject's body and along the positive X-Axis direction) which moves the enclosure 1302 and support 1304 along the path 1360 defined by the rotation of the four-bar linkage 1324, moving the enclosure 1302 and support 1304 backward (toward the positive X-Axis direction) relative to the ground-contacting element 1310. The position of the center of gravity 1340 of the vehicle 1300 moves backward in response to the enclosure 1302 and support 1304 moving backward. A negative torque is generated by the ground-contacting element 1310 in response to the position of the center of gravity 1340 of the vehicle 1300 moving backward.

In some embodiments, the vehicle 1300 includes two laterally disposed ground-contacting elements. The vehicle also includes two four-bar linkages (e.g., two of the four-bar linkages 1324). Each four-bar linkage is coupled to one of the two laterally disposed ground-contacting elements, similarly as described with respect to FIG. 11C.

In some embodiments, one or more four-bar linkages are flexible bars. The flexible bars bend to permit, for example, the enclosure and support to move along a path (e.g., the path 1360 of FIG. 11C).

Figure 11D:
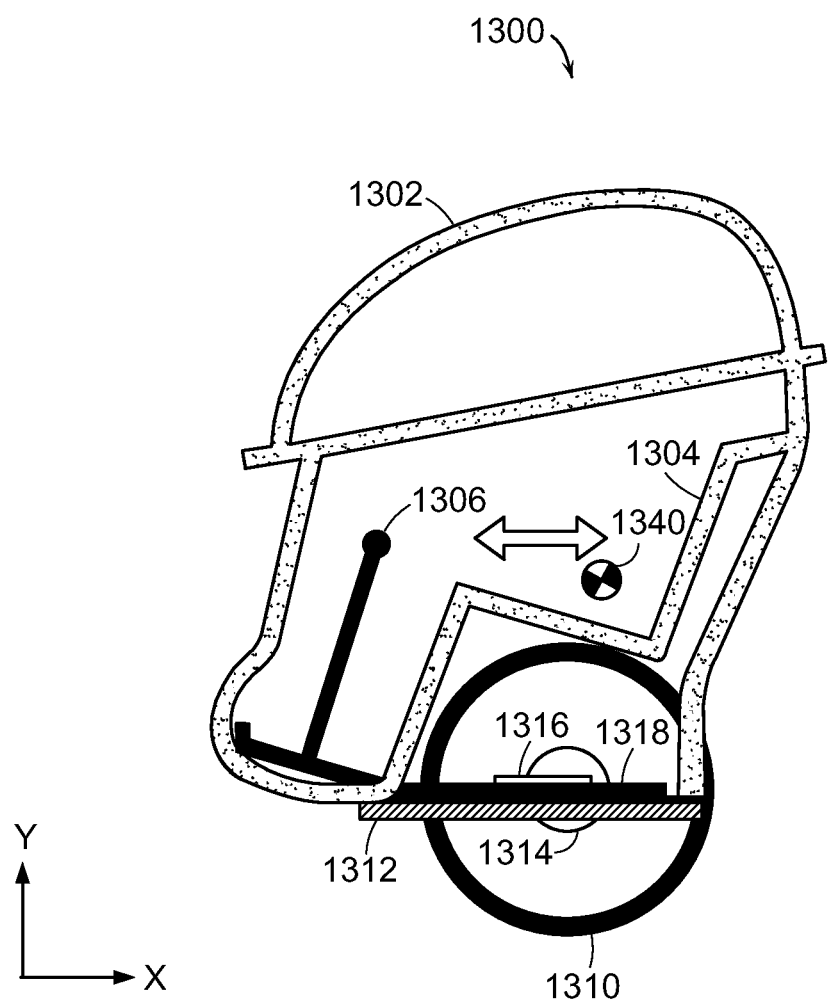
FIG. 11D is a schematic illustration of a vehicle, according to an illustrative embodiment of the invention.

FIG. 11D is a schematic illustration of the vehicle 1300, according to an illustrative embodiment of the invention. The enclosure 1302 is coupled to the support 1304. The at least one ground-contacting element 1310 is coupled to the platform 1312. The ground-contacting element 1310 rotates about the axle 1314. A structure (combination of rail 1316 and rail guide 1318) couples the enclosure 1302 and support 1304 are coupled to the platform 1312 and ground-contacting element 1310. The enclosure 1302 and support 1304 are coupled to the rail 1316. The rail guide 1318 is coupled to the platform 1312 of the ground-contacting element 1310. The enclosure 1302, support 1304 and rail 1316 slide together relative to the rail guide 1318.

In this embodiment, a human subject (not shown) manipulates an input device 1306 to cause the position of the center of gravity 1340 of the vehicle 1300 to change. This embodiment lacks a linkage (e.g., the linkage 1308 of FIGS. 13A, 13B and 13C). The human subject pulls the input device 1306 backward (toward the positive X-Axis direction) which moves the enclosure 1302 and support 1304 forward (toward the negative X-Axis direction) relative to the ground-contacting element 1310. The position of the center of gravity 1340 of the vehicle 1300 moves forward in response to the enclosure 1302 and support 1304 moving forward. A forward torque is generated by the ground-contacting element 1310 in response to the position of the center of gravity 1340 of the vehicle 1300 moving forward. The human subject pushes the input device 1306 forward (away from the human subject's body and along the negative X-Axis direction) which moves the enclosure 1302 and support 1304 backward (toward the positive X-Axis direction) relative to the ground-contacting element 1310. The position of the center of gravity 1340 of the vehicle 1300 moves backward in response to the enclosure 1302 and support 1304 moving backward. A backward torque is generated by the ground-contacting element 1310 in response to the position of the center of gravity 1340 of the vehicle 1300 moving backward.

Figure 12A:
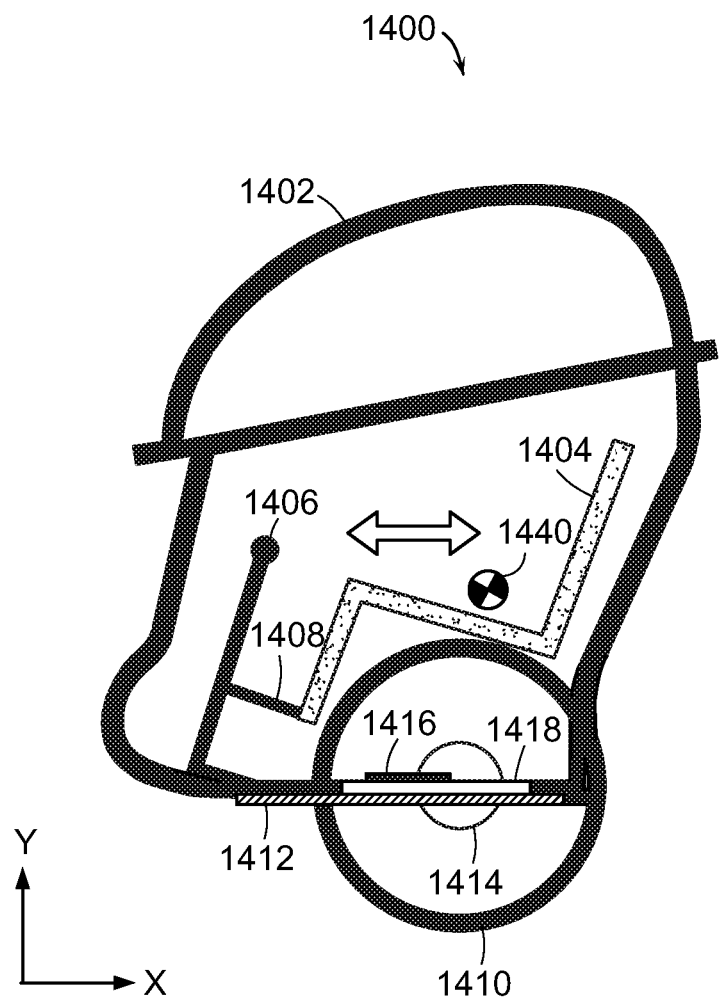
FIG. 12A is a schematic illustration of a vehicle, according to an illustrative embodiment of the invention.

FIG. 12A is a schematic illustration of a vehicle 1400, according to an illustrative embodiment of the invention. The vehicle 1400 includes an enclosure 1402 coupled to a platform 1412. The vehicle 1400 also includes at least one ground-contacting element 1410 coupled to the platform 1412. The ground-contacting element 1410 rotates about an axle 1414. A structure (combination of rail 1416 and rail guide 1418) couples the support 1404 to the combination of the platform 1412, enclosure 1402 and ground-contacting element 1410. A support 1404 is coupled to a rail 1416. The support 1404 and rail 1416 slide relative to a rail guide 1418 that is coupled to the platform 1412. In some embodiments, the rail guide 1418 is instead coupled to the enclosure 1402.

In this embodiment, a human subject (not shown) manipulates an input device 1406 to cause the position of the center of gravity 1440 of the vehicle 1400 to change. The input device 1406 is coupled to a linkage 1408. The linkage 1408 is coupled to the support 1404. The human subject pushes the input device 1406 forward (toward the negative X-Axis direction) which moves the support 1404 forward (toward the negative X-Axis direction) relative to the enclosure 1402, the platform 1412 and the ground-contacting element 1410. The position of the center of gravity 1440 of the vehicle 1400 moves forward in response to the support 1404 moving forward. A forward torque is generated by the ground-contacting element 1410 in response to the center of gravity 1440 of the vehicle 1400 moving forward. The human subject pulls the input device 1406 backward (toward the human subject's body and along the positive X-Axis direction) which moves the support 1404 backward (toward the positive X-Axis direction) relative to the enclosure 1402, the platform 1412 and the ground-contacting element 1410. The position of the center of gravity 1440 of the vehicle 1400 moves backward in response to the enclosure 1402 and support 1404 moving backward. A negative torque is generated by the ground-contacting element 1410 in response to the position of the center of gravity 1440 of the vehicle 1400 moving backward.

Figure 12B:
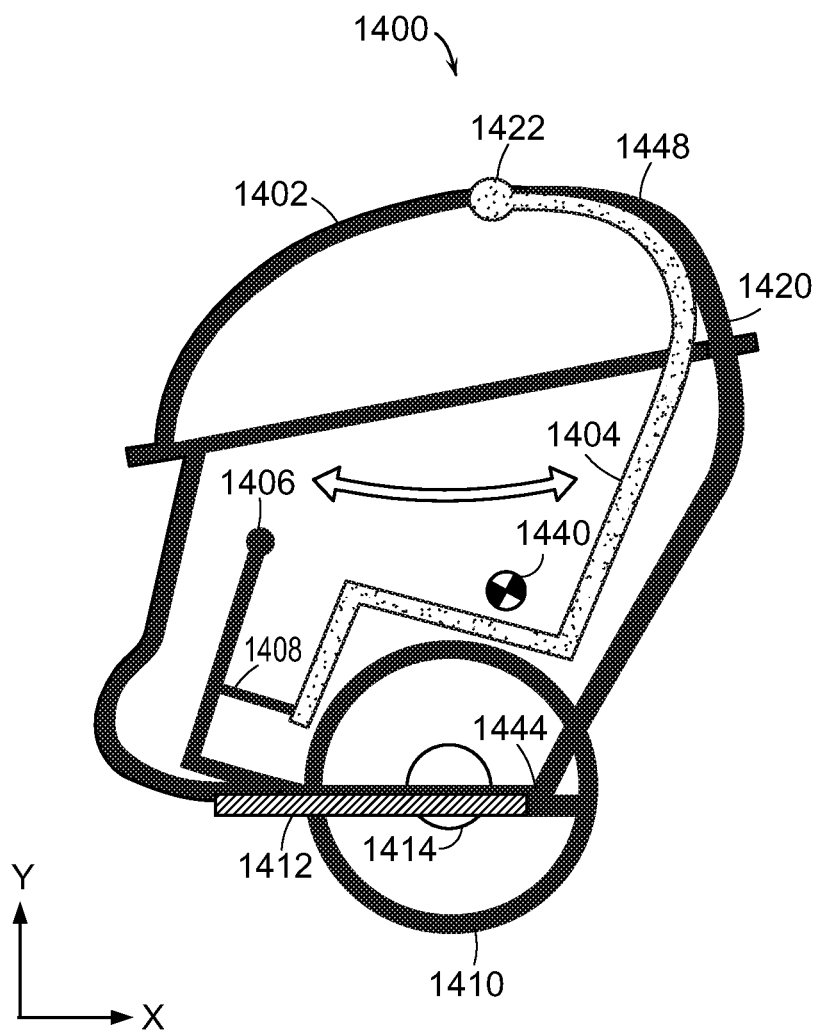
FIG. 12B is a schematic illustration of a vehicle, according to an illustrative embodiment of the invention.

FIG. 12B is a schematic illustration of the vehicle 1400, according to an illustrative embodiment of the invention. The enclosure 1402 is coupled to the platform 1412. The at least one ground-contacting element 1410 is coupled to the platform 1412. The ground-contacting element 1410 rotates about the axle 1414. A structure (the pivot member 1420) couples the support 1402 to the platform 1412, enclosure 1402 and ground-contacting element 1410. The support 1404 is coupled to a pivot member 1420 with a pivot mechanism 1422 located at a first end 1448 of the pivot member 1420. The pivot member 1420 is coupled to the platform 1412 at a second end 1444 of the pivot member 1420. The support 1404 pivots about the pivot mechanism (around the Z-Axis).

In this embodiment, a human subject (not shown) manipulates an input device 1406 to cause the position of the center of gravity of the vehicle 1400 to change. The input device 1406 is coupled to the linkage 1408. The linkage 1408 is coupled to the support 1404. The human subject pushes the input device 1406 forward (toward the negative X-Axis direction) which moves the support 1404 forward (toward the negative X-Axis direction) relative to the enclosure 1402, the platform 1412 and the ground-contacting element 1410. The position of the center of gravity 1440 of the vehicle 1400 moves forward in response to the support 1404 moving forward. A forward torque is generated by the ground-contacting element 1410 in response to the position of the center of gravity 1440 of the vehicle 1400 moving forward. The human subject pulls the input device 1406 backward (toward the human subject's body and along the positive X-Axis direction) which moves the support 1404 backward (toward the positive X-Axis direction) relative to the enclosure 1402, the platform 1412 and the ground-contacting element 1410. The position of the center of gravity 1440 of the vehicle 1400 moves backward in response to the pivot member 1420 and support 1404 moving backward. A negative torque is generated by the ground-contacting element 1410 in response to the position of the center of gravity of the vehicle 1400 moving backward.

Figure 12C:
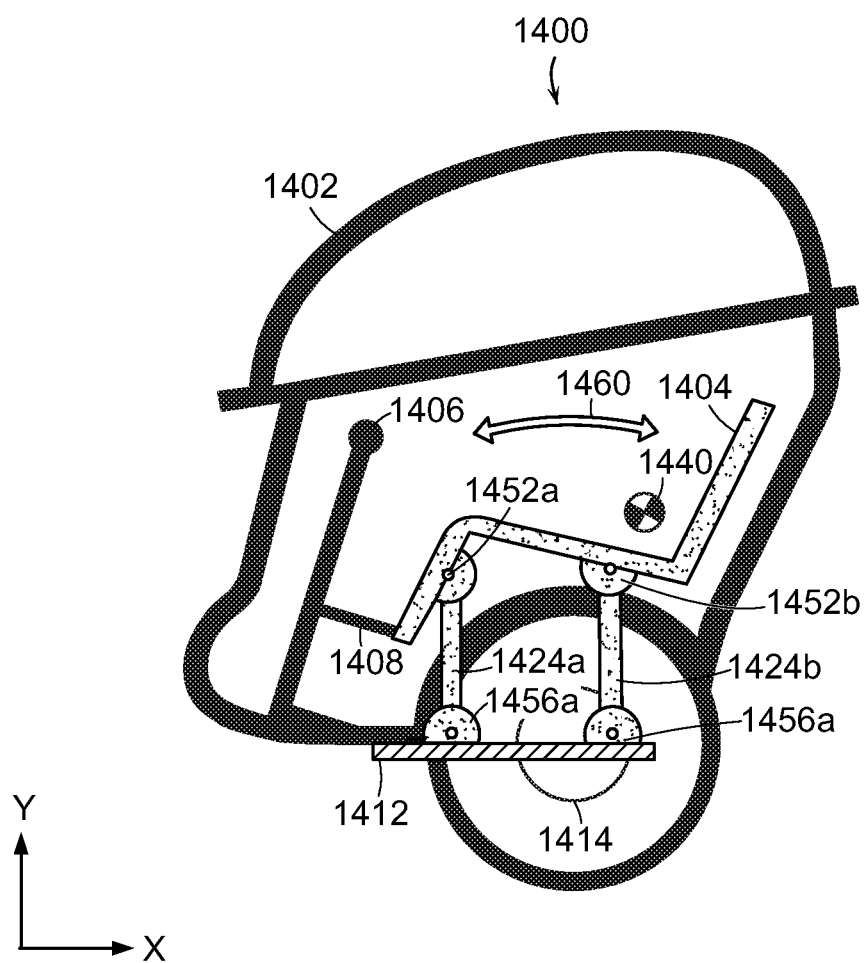
FIG. 12C is a schematic illustration of a vehicle, according to an illustrative embodiment of the invention.

FIG. 12C is a schematic illustration of the vehicle 1400, according to an illustrative embodiment of the invention. The enclosure 1402 is coupled to the platform 1412. The at least one ground-contacting element 1410 is coupled to the platform 1412. The ground-contacting element 1410 rotates about the axle 1414. The support 1404 is coupled to at least one four-bar linkage 1424 (first bar 1424a and second bar 1424b). A first end 1452a of the first bar 1424a is coupled to the support 1304. A second end 1456a of the first bar 1424a is coupled to the platform 1412. A first end 1452b of the second bar 1424b is coupled to the support 1404. A second end 1456b of the second bar 1424b is coupled to the platform 1412.

The support 1404 movies along a path 1460 defined by a rotation of the four-bar linkage 1424 about the axle 1414 of the ground-contacting element 1410 in the X-Y plane. In this embodiment, a human subject (not shown) manipulates an input device 1406 to cause the position of the center of gravity of the vehicle 1400 to change. The input device 1406 is coupled to the linkage 1408. The linkage 1408 is coupled to the support 1404. The human subject pushes the input device 1406 forward (toward the negative X-Axis direction) which moves the enclosure 1402 and support 1404 forward (toward the negative X-Axis direction) relative to the enclosure 1402, the platform 1412 and the ground-contacting element 1410. The position of the center of gravity 1440 of the vehicle 1400 moves forward in response to the support 1404 moving forward. A forward torque is generated by the ground-contacting element 1410 in response to the position of the center of gravity 1440 of the vehicle 1400 moving forward. The human subject pulls the input device 1406 backward (toward the human subject's body and along the positive X-Axis direction) which moves the enclosure 1402 and support 1404 backward (toward the positive X-Axis direction) relative to the enclosure 1402, the platform 1412 and the ground-contacting element 1410. The position of the center of gravity 1440 of the vehicle 1400 moves backward in response to the support 1404 moving backward. A negative torque is generated by the ground-contacting element 1410 in response to the position of the center of gravity 1440 of the vehicle 1400 moving backward.

In some embodiments, the vehicle 1400 includes two laterally disposed ground-contacting elements. The vehicle also includes two four-bar linkages (e.g., two of the four-bar linkages 1424). Each four-bar linkage is coupled to one of the two laterally disposed ground-contacting elements, similarly as described with respect to FIG. 12C.

In some embodiments, one or more four-bar linkages are flexible bars. The flexible bars bend to permit, for example, the enclosure and support to move along a path (e.g., the path 1460 of FIG. 12C).

Figure 12D:
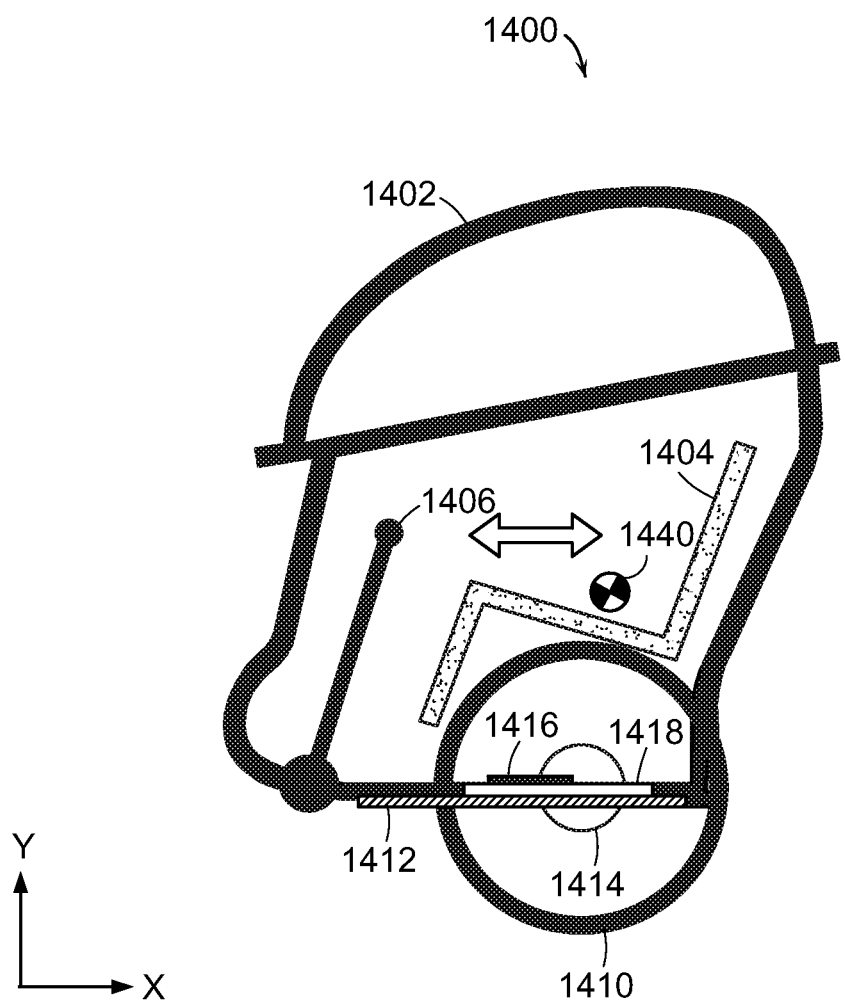
FIG. 12D is a schematic illustration of a vehicle, according to an illustrative embodiment of the invention.

FIG. 12D is a schematic illustration of a vehicle 1400, according to an illustrative embodiment of the invention. The enclosure 1402 is coupled to the platform 1412. The ground-contacting element 1410 is coupled to the platform 1412. The ground-contacting element 1410 rotates about the axle 1414. A structure (combination of rail 1416 and rail guide 1418) couples the support 1404 to the platform 1412, enclosure 1402 and ground-contacting element 1410. The support 1404 is coupled to the rail 1416. The support 1404 and rail 1416 slide relative to the rail guide 1418 that is coupled to the platform 1410.

In this embodiment, a human subject (not shown) manipulates an input device 1406 to cause the center of gravity 1440 of the vehicle 1400 to change. This embodiment lacks a linkage (e.g., the linkage 1408 of FIGS. 14A, 14B and 14C). The human subject pushes the input device 1406 forward (toward the negative X-Axis direction) which moves the support 1404 backward (toward the positive X-Axis direction) relative to the enclosure 1402, the platform 1412 and the ground-contacting element 1410. The position of the center of gravity 1440 of the vehicle 1400 moves backward in response to the support 1404 moving backward. A reverse torque is generated by the ground-contacting element 1410 in response to the position of the center of gravity 1440 of the vehicle 1400 moving backward. The human subject pulls the input device 1406 backward (toward the human subject's body and along the positive X-Axis direction) which moves the support 1404 forward (toward the negative X-Axis direction) relative to the enclosure 1402, the platform 1412 and the ground-contacting element 1410. The position of the center of gravity 1440 of the vehicle 1400 moves forward in response to the support 1404 moving forward. A forward torque is generated by the ground-contacting element 1410 in response to the position of the center of gravity of the vehicle 1400 moving forward.

In some embodiments, the support (e.g., support 1404 of FIG. 12A) moves relative to the enclosure (e.g., enclosure 1402 of FIG. 12A). The enclosure is constructed so that the support moves within the enclosure to create an effective change in position of center of gravity of the vehicle.

In some embodiments, the support (e.g., support 1304 of FIG. 11A) and the enclosure (e.g., enclosure 1302 of FIG. 11A) are coupled together and, in combination, move relative to the ground-contacting element (e.g., ground-contacting element 1310 of FIG. 11A) to create an effective change in position of center of gravity of the vehicle. Because the support and enclosure move together, the interior volume of the enclosure can be made less than would otherwise be necessary to accommodate movement of the support within the enclosure. In some embodiments, the vehicle includes a seat belt (or other human subject or payload restraint). Because the support and enclosure move together, the seat belt can be anchored to the enclosure. If the support moved relative to the enclosure, the seat belt assembly would need to be designed to accommodate the movement of the support relative to the enclosure to insure that the seat belt still accomplished its role to protect the payload or human subject disposed on the support.

In some embodiments, the linkage (e.g., the linkage 1308 of FIGS. 11A, 11B and 11C or the linkage 1408 of FIGS. 12A, 12B and 12C) has a linkage ratio that is adjustable. In some embodiments, the adjustable linkage ratio is set (e.g., by a user, the manufacturer or by a vehicle module) to vary vehicle control stiffness, response and/or feel.

In some embodiments, the vehicle has a support that supports more than one human subject. In some embodiments, the vehicle can be controlled by either human subject.

In some embodiments, the vehicle has an input device that is a footrest. Human subject motion of the footrest causes the position of the center of gravity of the vehicle to change. In some embodiments, the footrest is coupled to the platform of the vehicle by a linkage and movement of the footrest away from the human subject causes the position of the center of gravity to move backward relative to the ground-contacting elements. In some embodiments, the input device includes both a control yoke and a footrest and movement of the control yoke and footrest away from the human subject causes the position of the center of gravity to move backward and movement of the control yoke and footrest towards the human subject causes the position of the center of gravity to move forward.

In some embodiments, the change in the position of a center of gravity of a vehicle results in an equal, lesser or greater change in the torque applied to a) one or more ground-contacting elements of the vehicle or b) commanded velocity of the vehicle. For example, the change in torque applied to a ground-contacting element can have a non-linear relationship (e.g., quadratic) relationship to the change in the position of the center of gravity of the vehicle. In one embodiment, the non-linear relationship amplifies the effect of the change in the position of the center of gravity for an experienced human subject and/or reduces the effect of the change in the position of the center of gravity for an inexperienced human subject.

In some embodiments, a small motion (i.e., change of position of the center of gravity) creates a relatively level platform of the vehicle with moderate acceleration or deceleration. In some embodiments, a large motion (i.e. change of position of the center of gravity) creates a large change in pitch of the vehicle and high rate or acceleration or deceleration.

In some embodiments, the effect of the change in the position of the center of gravity is changed by, for example, adding or subtracting a vehicle pitch-related parameter to a command signal provided to one or more ground-contacting elements.

In some embodiments, an actuator coupled to a portion of the vehicle changes the position of the center of gravity of the vehicle. For example, in some embodiments, the actuator is coupled to a moving component of the vehicle (e.g., the support 1404 of FIG. 12D) and the vehicle has an input device that is coupled (e.g., wired or wirelessly) to the actuator. Motion of the input device commands the actuator to move, which causes the support to move relative to the ground-contacting elements of the vehicle. Movement of the support forward relative to the ground-contacting elements causes the position of the center of gravity of the vehicle to move forward which causes the vehicle to move forward. In some embodiments, the vehicle is not used to support a human subject and the actuator can be used to command a change in the position of the center of gravity of the vehicle.

In some embodiments, the actuator includes a locking out mechanism that inhibits a change in the center of gravity of the vehicle. For example, in an alternative embodiment of the invention described with respect to FIG. 11A, the vehicle 1300 includes an actuator with a locking out mechanism. The locking out mechanism limits or prevents motion of the rail 1316 coupled to the support 1304 relative to the rail guide 1318 coupled to the platform 1312. The locking out mechanism could be a pin in the rail 1316 that is inserted into one or a plurality of corresponding apertures located in the rail guide 1318. The locking out mechanism could be a brake (friction or disk break) coupled to the rail 1316 and rail guide 1318. In some embodiments, the locking out mechanism includes one or more mechanical stops coupled to the rail 1316 and rail guide 1318. In some embodiments, the one or more mechanical stops engage in response to a predefined condition (e.g., rapid deceleration of the vehicle). The mechanical stop can be triggered if an emergency shut down of the vehicle 1300 is required.

Figure 13A:
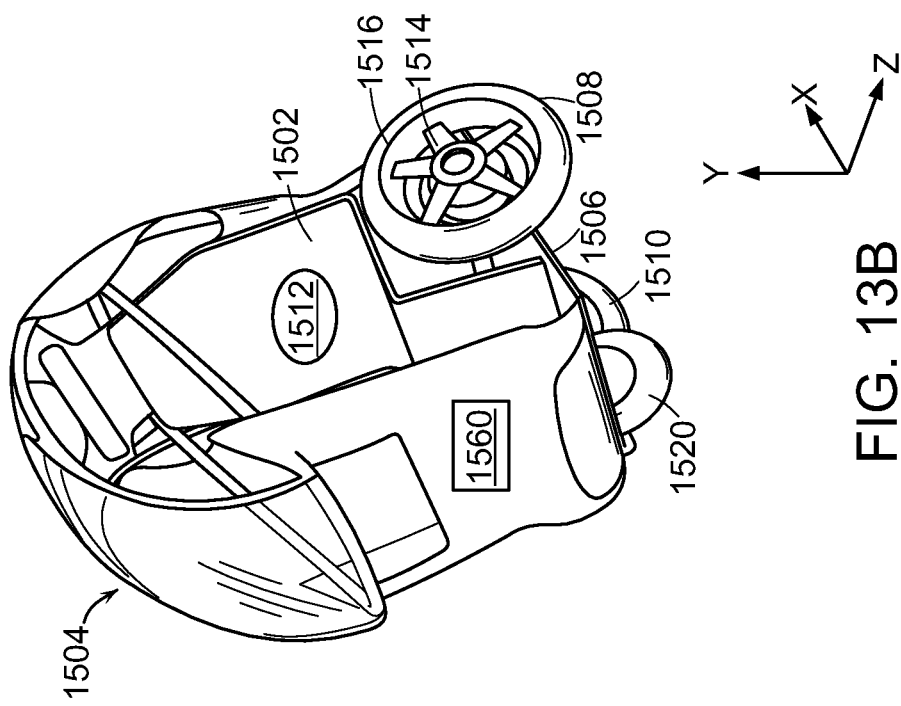
FIG. 13A is a three-dimensional view of a vehicle, in accordance with an embodiment of the invention.
Figure 13B:
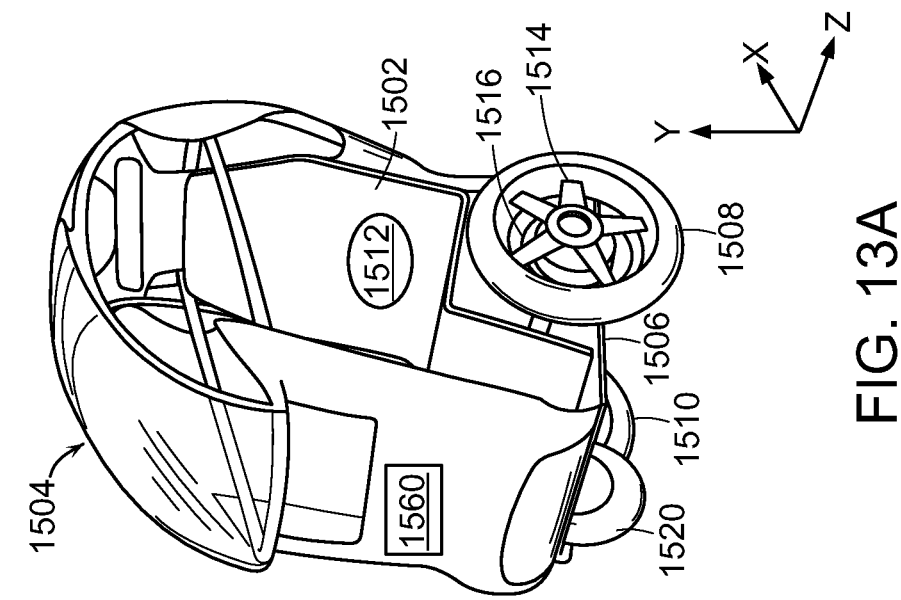
FIG. 13B is an alternative configuration of the vehicle of FIG. 13A.

FIGS. 13A and 13B are three-dimensional views of a vehicle 1500, according to illustrative embodiments of the invention. A human subject (not shown) rests on a support 1502 in an enclosure 1504 that at least partially encloses the human subject. The vehicle 1500 includes at least three ground-contacting elements 1508, 1510, 1520. The three ground-contacting elements 1508, 1510, 1520 are coupled to a platform 1506. The ground-contacting element 1520 is a stabilizer ground-contacting element.

The ground-contacting elements 1508, 1510 are laterally disposed relative to each other and rotate about an axle 1514. Ground-contacting element 1508 is powered by a drive 1516 and ground-contacting element 1510 is powered by a drive (not shown for clarity of illustration purposes). The third ground-contacting element 1520 is disposed toward the front of the platform 1506 (positioned toward the negative X-axis direction relative to the two ground-contacting elements 1508 and 1510). The third ground-contacting element 1520 rotates about an axle 1522. In an alternative embodiment, the ground-contacting elements 1508, 1510 are coupled to the platform 1506 and ground-contacting element 1520 is coupled to the enclosure 1504.

With respect to FIG. 13A, when the vehicle 1500 is balanced, the third ground-contacting is nominally positioned such that the third ground-contacting element 1520 does not touch the ground when the vehicle 1500 is in an upright position and the platform 1506 is parallel with the ground. As shown in FIG. 13B, when the vehicle 1500 is not balanced, the vehicle 1500 tips forward to rest on the third ground-contacting element 1520 providing static stability of the vehicle 1500.

In some embodiments, the third ground-contacting element 1520 includes a wheel, skid, ball or post. In an alternative embodiment, the third ground-contacting element 1520 is disposed toward the rear of the platform 1506, such that the vehicle 1500 tips backward to rest on the third ground-contacting element 1520. In some embodiments, it is desirable for the third ground-contacting element 1520 to be located toward the rear of the vehicle 1500. In situations where it is desirable to stop very quickly, for example, if an emergency stop is triggered, placement of the third ground-contacting element 1520 towards the rear of the platform 1506 helps ensure that a rearward portion of the vehicle 1500 does not touch the ground while stopping and instead rests on the third ground-contacting element 1520. While a deceleration torque is applied to the two laterally disposed ground-contacting elements 1508, 1510, the third ground-contacting element 1520 stabilizes the vehicle 1500.

In some embodiments, there is a fourth ground-contacting element (not shown) and both the third ground-contacting element 1520 and the fourth ground-contacting element are positioned toward the front of the vehicle 1500 (toward the negative X-axis direction relative to the two ground-contacting elements 1508 and 1510). The third ground-contacting element 1520 and the fourth ground-contacting element are laterally disposed relative to each other to provide additional lateral stability to the vehicle 1500 when the third ground-contacting element 1520 and fourth ground-contacting element are in contact with the ground. In some embodiments, the third ground-contacting element 1520 and the fourth ground-contacting element are disposed toward the rear of the platform.

In some embodiments, each of the ground-contacting elements 1508, 1510 and 1520 are coupled to one or more motor drives allowing for positive or negative torque to be applied to any of the ground-contacting elements 1508, 1510, 1520.

In various embodiments, the third ground-contacting element 1520 is retractable. The retractable third ground-contacting element 1520 is deployed and retracted, for example, by an actuator attached to the vehicle 1500. In some embodiments, the third ground-contacting element is linked to an input device (e.g., input device 1306 or 1406, as discussed above). Motion of the input device, can cause the third ground-contacting element 1520 to be extended or refracted.

In some embodiments, the third ground-contacting element 1520 includes a break to at least assist with decelerating the vehicle 1500.

In some embodiments, the vehicle 1500 includes an input device and linkage (e.g., input device 1306 and linkage 1308 of FIG. 11A). When the vehicle 1500 is tilted forward (tilted toward the negative X-axis direction) it rests on the third ground-contacting element 1520. Because the input device is coupled to the linkage, the input device is located towards the front of the vehicle 1500 (towards the negative X-axis direction), locating the input device in a position within the enclosure that makes it easier for a human subject to mount and dismount (enter or exit) the vehicle 1500.

In some embodiments, the portion of the support 1502 on which a human subject would sit (or a payload would be located) is parallel to the ground plane when the vehicle 1500 rests on the third ground-contacting element 1520. Because the portion of the support 1502 on which the human subject would sit is parallel to the ground plane, it is easier for the human subject to mount or dismount (enter or exit) the vehicle 1500. When the vehicle 1500 tips backward in to balancing mode, the portion of the support 1502 on which a human subject would sit (or a payload would be located) is tipped backward creating a comfortable reclined position for the human subject (or a position that assists with securing the payload).

A controller 1560 (e.g., the controller 1200 of FIG. 10, is coupled to the drive 1516 for providing a control signal in response to changes in a position of a center of gravity 1512 of the vehicle 1500. In one embodiment, the controller 1560 operates in, at least, a start mode, dynamic stabilization mode and a stop mode. The vehicle 1500 is initially supported by each of the three ground-contacting elements 1508, 1510 and 1520 in the off mode.

The human subject mounts the vehicle 1500 in the off state. The vehicle is turned on and the start mode is triggered by a change in the position of the center of gravity 1512 of the vehicle 1500. In this embodiment, the human subject moves the center of gravity 1512 backward (toward the positive X-Axis direction) triggering the start mode. During the start mode, the center of gravity 1512 moves backward (as, for example commanded by the human subject) until the third ground-contacting element 1520 does not contact the ground.

When the third ground-contacting element 1520 is no longer in contact with the ground, the dynamic stabilization mode is triggered and the vehicle 1500 is balanced on the two laterally disposed ground-contacting elements 1508 and 1510. The human subject then operates the vehicle 1500 similarly as described herein.

In this embodiment, the stop mode is triggered by an operator issuing a command to the controller 1560 (e.g., depressing a button or pushing a touch pad screen coupled to the controller). The vehicle 1500 tips forward to rest on the third ground-contacting element 1520 in response to the triggering of the stop mode.

In some embodiments, the stop mode is triggered by a predetermined change in the position of the center of gravity of the vehicle 1500. If the human subject moves the center of gravity 1512 forward (toward the negative X-Axis direction) beyond a predetermined center of gravity threshold, the stop mode is triggered. The vehicle 1500 decelerates to a complete stop before tipping forward to rest on the third ground-contacting element 1520. Alternatively, the vehicle 1500 can start tipping forward as the vehicle decelerates and the third ground-contacting element 1520 comes in to contact with the ground when the vehicle reaches a predetermined (e.g., safe) speed.

Various embodiments exist for triggering and operating the various operating modes of the vehicle 1500. For example, the start and/or stop mode can be specified by the human subject via an input device (e.g., handheld or vehicle mounted processor). In some embodiments, a human subject or user initiates the dynamic stabilization mode. The center of gravity threshold for the start and/or stop mode can be human subject specified or determined by the controller 1560 based on the experience level of the human subject and/or based on a center of gravity position stored the last time the vehicle 1500 was operated.

Some embodiments of the invention include additional operating modes. In some embodiments, the vehicle 1500 includes a position-keeping mode in which the vehicle 1500 is balanced and nominally positioned in one location relative to the ground plane. While operating in position-keeping mode, the sensitivity of the vehicle 1500 to changes in the position of the center of gravity of the vehicle 1500 is increased to allow the vehicle to remain balanced and nominally positioned in one location to create a stable riding experience for a human subject while the vehicle 1500 is, for example, stopped (e.g., at a red light). The vehicle 1500 maintains its balance and stays still even if there are perturbations (e.g., small or large) to the position of the center of gravity of the vehicle 1500 by causing a pitch of the vehicle in a direction opposite to the perturbation of the center of gravity.

In one embodiment, the position-keeping mode is an operating mode the vehicle 1500 enters when the velocity of the ground-contacting elements 1508 and 1510 are below a predetermined threshold, the yaw velocity of the ground-contacting elements 1508 and 1510 are below a predetermined threshold, and the position of the center of gravity 1512 is below a threshold. Exit from the position-keeping mode is triggered when any of these parameters exceed the same (or different) thresholds.

In one embodiment of the invention, the vehicle 1500 enters a position-keeping mode when the following conditions are present 1) the average velocity of the left and right ground-contacting elements 1508 and 1510 is less than 0.7 MPH (0.313 m/s); 2) yaw velocity of the vehicle is less than 20 degrees/second; 3) velocity of the shaft attached to the left ground-contacting element 1508 is less than 0.7 MPH (0.313 m/s); 4) velocity of the shaft attached to the right ground-contacting element 1508 is less than 0.7 MPH (0.313 m/s); 5) the position of the support 1502 relative to a predefined neutral position along the X-Axis is within 0.5 inches (12.7 mm) in the forward direction; 6) the position of the support 1502 relative to a predefined neutral position along the X-Axis is within 1.5 inches (38.1 mm) in the rearward direction; 7) the pitch of the vehicle is less than 4.0 degrees from a predefined neutral orientation; and 8) the pitch rate value is less than 15.0 degrees/second.

In one embodiment, the vehicle 1500 exits the position-keeping mode when at least one of the following conditions is present 1) the position of the support 1502 relative to a predefined neutral position along the X-Axis is greater than 1.25 inches (31.8 mm) in the forward direction; 2) the position of the support 1502 relative to a predefined neutral position along the X-Axis is greater than 2.5 inches (63.5 mm) in the rearward direction; 3) velocity of the shaft attached to the left ground-contacting element 1508 is greater than 1.5 MPH (0.671 m/s); or 4) velocity of the shaft attached to the right ground-contacting element 1508 is greater than 1.5 MPH (0.671 m/s).

In some embodiments, the vehicle 1500 includes static and dynamic modes. In one embodiment, the vehicle is balancing and is operating in a static mode, the controller 1560 is operating a one-sided pitch controller which does not allow rearward pitch of the vehicle 1500, so that the vehicle 1500 only moves backward if the position of the center of gravity of the vehicle is moved backward. If the position of the center of gravity is moved forward, the controller 1560 allows forward pitch of the vehicle 1500 until the stabilizer ground-contacting element 1520 contacts the ground. In some embodiments, the vehicle is balancing and the controller 1560 is configured to operate in a static mode that ignores a request to trigger the stop mode until the vehicle 1500 is moving below a predetermined speed and/or acceleration. In some embodiments, the controller 1560 is configured so that the vehicle 1500 does not immediately respond to initiate rearward movement of the vehicle after a quick stop of the vehicle 1500. The vehicle 1500 can be commanded to respond in this manner by, for example, pitching the vehicle forward as it comes to a stop or by commanding an actuator to vary the position of the center of gravity of the vehicle (e.g., commanding an actuator to move the support and enclosure relative to the ground-contacting elements).

In some embodiments, input from the human subject is ignored during the start and/or stop mode to avoid unintended motion of the vehicle 1500. In one embodiment, the vehicle 1500 has a smoothing function that smoothly transitions from the start mode to the dynamic stabilization mode to be comfortable for the human subject. For example, in one embodiment, the smoothing function includes a low pass filter that filters out high frequency motions (e.g., jittery human subject commands) as the vehicle transitions from start mode to the dynamic stabilization mode.

Various embodiments exist for detecting trigger commands (e.g., start and/or stop mode triggers). In one embodiment, a force sensor coupled to the third ground-contacting element 1520 detects contact of the third ground-contacting element 1520 with the ground or a position sensor (contact or non-contact position sensor) detects a position of the third ground-contacting element 1520 relative to, for example, the ground or a stationary location on the vehicle 1500. In some embodiments, the controller senses pitch and/or pitch rate of the vehicle 1500 to enable dynamic stabilization or the stop mode based on, for example, a rate gyro sensor.

In some embodiments, the controller 1560 compensates for unintended contact of the third ground-contacting member 1520 with the ground while the vehicle is dynamically stabilized. For example, during uphill travel, the platform 1506, enclosure 1504 and support 1502 can pitch forward to maintain an upright position (relative to an earth vertical axis) of the human subject. A third ground-contacting element 1520 that is not retractable and which is positioned toward the front of the platform 1506 unintentionally contacts the ground because the vehicle 1500 pitches forward. The unintentional ground contact of the third ground-contacting element 1520 creates a force on the vehicle 1500 causing an unintentional change in the position of the center of gravity 1512. As discussed above, a change in the position of the center of gravity 1512 accelerates or decelerates the vehicle 1500. In this manner, the controller 1560 can be configured to sense the contact of the third ground-contacting element 1520 with the ground and ignore a change in the position of the center of gravity 1512 which is proportional to the force exerted by the ground on the third ground-contacting element 1520. This compensates for the unintended contact of the third ground-contacting element 1520 with the ground.

In further embodiments of the invention, a remote control is used to operate the vehicle 1500. The remote control is used to vary the position of the center of gravity 1512 by, for example, an operator commanding a change to a pitch of the vehicle 1500 or controlling an actuated center of gravity shifting mechanism to cause the position of the center of gravity 1512 of the vehicle 1500 to change. In one embodiment, the center of gravity shifting mechanism can be disabled by being locked. In other embodiments, the remote control controls the three ground-contacting elements 1508, 1510, 1520, such that the vehicle 1500 may be commanded to move on all three ground-contacting elements 1508, 1510, 1520. Torque commands can be provided to one or more of the ground-contacting element 1508, 1510 and 1520. Additionally, the remote control can disable the vehicle's 1500 response to a change in the position of the center of gravity 1512.

Figure 14:
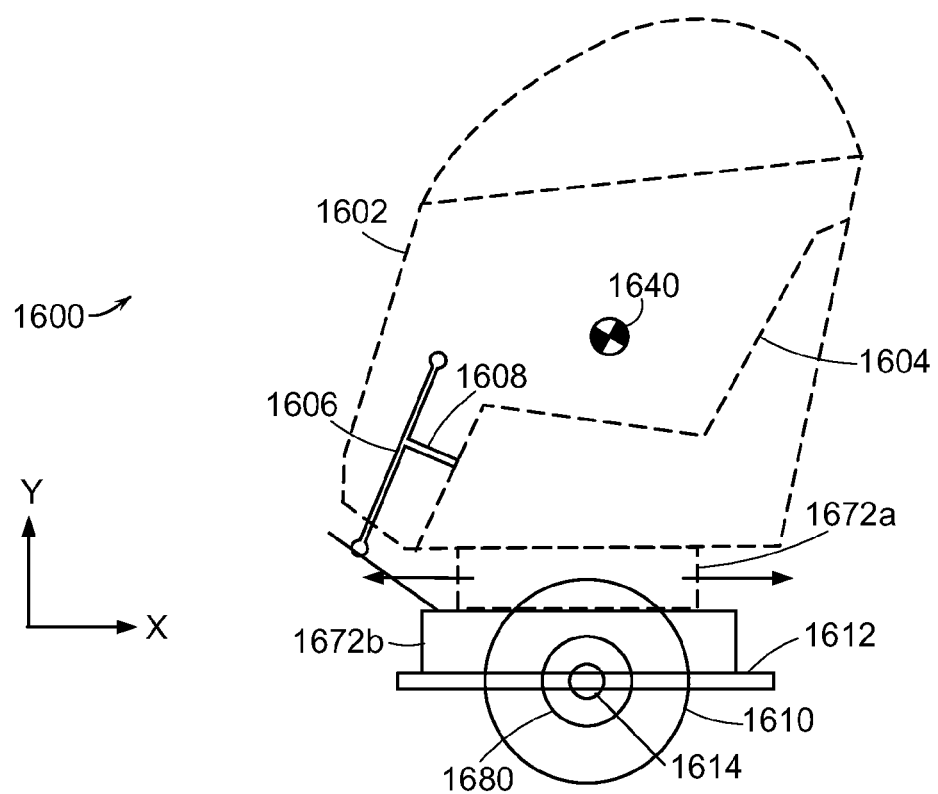
FIG. 14 is a schematic illustration of a vehicle, according to an illustrative embodiment of the invention.

FIG. 14 is a schematic illustration of a vehicle 1600, according to an illustrative embodiment of the invention. The vehicle 1600 includes an enclosure 1602 coupled to a support 1604. The vehicle 1600 also includes at least one ground-contacting element 1610 coupled to a platform 1612. The ground-contacting element 1610 rotates about an axle 1614 which is coupled to the platform 1612. The vehicle 1600 includes a first drive 1672 (combination of drive component 1672a and drive component 1672b). The first drive 1672 allows for movement of the enclosure 1602 and support 1604 (coupled to drive component 1672a) relative to the ground-contacting element 1610 and platform 1612 (coupled to the drive component 1672b). A control system (e.g., the control system 1200 of FIG. 10) coupled to the first drive 1672 controls balancing of the vehicle 1600 in response to the position of the enclosure 1602 and support 1604 (coupled to drive component 1672a) relative to the ground-contacting element 1610 and platform 1612 (coupled to the drive component 1672b). In some embodiments, the first drive 1672 is electrically actuated to maintain the position of the center of gravity 1640 of the vehicle 1600 above the location that the ground-contacting element 1610 contacts the ground to maintain balance of the vehicle in the fore-aft direction.

The vehicle 1600 also includes a second drive 1680 coupled to the platform 1612 and the ground-contacting element 1610. The second drive 1680 (e.g., a motorized drive) delivers power to the ground-contacting element 1610 to cause rotation of the ground-contacting element to move the vehicle fore (towards the negative X-Axis direction) and aft (towards the positive X-Axis direction). The second drive can include, for example, an internal combustion engine, pedal or crank coupled to the second drive for delivering power to the ground-contacting elements. In some embodiments, the vehicle 1600 includes two or more laterally disposed ground-contacting elements 1610 which assist with providing lateral stability to the vehicle 1600.

The vehicle 1600 includes an input device 1606. A human subject (not shown) manipulates the input device 1306 to command the second drive 1680 to command rotation of the ground-contacting element 1610 to move the vehicle in the fore and aft directions.

In various embodiments, the disclosed methods can be implemented as a computer program product for use with a computer system. Such implementations can include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium can be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems.

Furthermore, such instructions can be stored in any memory device, such as semiconductor, magnetic, optical or other memory devices, and can be transmitted using any communications technology, such as optical, infrared, microwave, or other transmission technologies. It is expected that such a computer program product can be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention can be implemented as a combination of both software (e.g., a computer program product) and hardware. Still other embodiments of the invention are implemented as entirely hardware, or entirely software (e.g., a computer program product).

The described embodiments of the invention are intended to be merely exemplary and numerous variations and modifications will be apparent to those skilled in the art. All such variations and modifications are intended to be within the scope of the present invention as defined in any appended claims.

The invention claimed is:

1. A vehicle for transporting a payload over a surface, the vehicle comprising:
   a support for supporting a payload;
   an enclosure for at least partially enclosing the payload;
   two laterally disposed ground-contacting elements coupled to at least one of the enclosure or the support;
   a drive coupled to the ground-contacting elements; and
   a controller coupled to the drive, for governing the operation of the drive at least in response to position of the center of gravity of the vehicle to dynamically control balancing of the vehicle by moving the ground-contacting elements fore and aft of the vehicle.

2. The vehicle of claim 1, comprising a second drive for delivering power to the ground-contacting elements to propel the vehicle fore and aft.

3. The vehicle of claim 1, wherein the drive is a motorized drive.

4. The vehicle of claim 1, wherein the controller coupled to the drive, governs the operation of the drive at least in response to pitch of the vehicle to dynamically control balancing of the vehicle.

5. The vehicle of claim 2, comprising a structure coupling the support and the enclosure to the ground-contacting elements, the structure allows for variation in the position of the center of gravity.

6. The vehicle of claim 5, wherein the structure includes rails allowing the enclosure and support to slide with respect to the ground-contacting elements.

7. The vehicle of claim 5, wherein the structure includes a pivot mechanism coupling the support and enclosure to the ground-contacting elements allowing the enclosure and support to pivot with respect to the ground-contacting elements.

8. The vehicle of claim 1, wherein the payload is a human subject and the vehicle includes an input device, the human subject pushes or pulls the input device allowing the human subject, support and enclosure to move with respect to the ground-contacting elements.

9. A method for transporting a payload over a surface with a vehicle, the method comprising:
   supporting a payload with a support;
   at least partially enclosing the support with an enclosure; and
   controlling operation of a drive coupled to two laterally disposed ground-contacting elements, coupled to at least one of the enclosure or support, in response to position of the center of gravity of the vehicle to dynamically control balancing of the vehicle by moving the ground contacting elements fore and aft of the vehicle.

10. The method of claim 9, comprising delivering power from the drive to the ground-contacting elements to move the ground-contacting elements fore and aft of the vehicle.

11. The method of claim 10, wherein the delivered power is in response to attitude of the vehicle.

12. The method of claim 9, comprising delivering power from a second drive to the ground-contacting elements to cause rotation of the ground-contacting elements to move the vehicle fore and aft.

13. The method of claim 9, wherein the enclosure is coupled to the support and the support and enclosure move relative to the ground-contacting elements to change the position of the center of gravity of the vehicle.

14. The method of claim 9, wherein the enclosure is coupled to the ground-contacting elements and the support moves relative to the enclosure and ground-contacting elements to change the position of the center of gravity of the vehicle.

15. A vehicle for transporting a payload over a surface, the vehicle comprising:
   a support for supporting a payload;
   an enclosure for at least partially enclosing the payload;
   two laterally disposed ground-contacting elements coupled to at least one of the enclosure or the support;
   a first drive coupled to the ground-contacting elements;
   a controller coupled to the first drive, for governing the operation of the first drive at least in response to position of the center of gravity of the vehicle to move the ground-contacting elements fore and aft of the vehicle to dynamically control balancing of the vehicle; and
   a second drive coupled to the ground-contacting elements to deliver power to the ground-contacting elements to propel the vehicle fore and aft.

16. The vehicle of claim 15, wherein the second drive dynamically controls balancing of the vehicle.

17. The vehicle of claim 15, comprising an internal combustion engine coupled to the second drive for delivering power to the ground-contacting elements.

18. The vehicle of claim 15, comprising rails coupled to the ground-contacting elements allowing the first drive to command the ground-contacting elements to move fore and aft of the vehicle to dynamically control balancing of the vehicle.

19. A method for transporting a payload over a surface with a vehicle, the method comprising:
   supporting a payload with a support;
   at least partially enclosing the support with an enclosure;
   controlling operation of a first drive coupled to two laterally disposed ground-contacting elements, coupled to at least one of the enclosure or support, in response to position of the center of gravity of the vehicle to move the ground-contacting elements fore and aft of the vehicle to dynamically control balancing of the vehicle; and controlling operation of a second drive coupled to the two laterally disposed ground-contacting elements to deliver power to the ground-contacting elements to propel the vehicle fore and aft.

20. The vehicle of claim 19, wherein the second drive dynamically controls balancing of the vehicle.

* * * * *